(12) United States Patent
Felsen et al.

(10) Patent No.: US 11,645,546 B2
(45) Date of Patent: May 9, 2023

(54) SYSTEM AND METHOD FOR PREDICTING FINE-GRAINED ADVERSARIAL MULTI-AGENT MOTION

(71) Applicant: STATS LLC, Chicago, IL (US)

(72) Inventors: Panna Felsen, Chicago, IL (US); Sujoy Ganguly, Chicago, IL (US); Patrick Lucey, Chicago, IL (US)

(73) Assignee: STATS LLC, Chicago, IL (US)

( * ) Notice: Subject to any disclaimer, the term of this patent is extended or adjusted under 35 U.S.C. 154(b) by 290 days.

(21) Appl. No.: 16/254,037

(22) Filed: Jan. 22, 2019

(65) Prior Publication Data

US 2019/0228316 A1    Jul. 25, 2019

Related U.S. Application Data

(60) Provisional application No. 62/619,891, filed on Jan. 21, 2018.

(51) Int. Cl.
*G06N 5/02* (2006.01)
*G06N 5/04* (2006.01)
*G06N 20/00* (2019.01)

(52) U.S. Cl.
CPC .............. *G06N 5/02* (2013.01); *G06N 5/04* (2013.01); *G06N 20/00* (2019.01)

(58) Field of Classification Search
None
See application file for complete search history.

(56) References Cited

U.S. PATENT DOCUMENTS 6,616,529 B1   9/2003   Qian et al.
6,710,713 B1   3/2004   Russo
(Continued)

FOREIGN PATENT DOCUMENTS

CN   1386241      12/2002
CN   105833502    8/2016
(Continued)

OTHER PUBLICATIONS

Xiaodan Liang, Lisa Lee, Wei Dai, Eric P. Xing. "Dual Motion GAN for Future-Flow Embedded Video Prediction." Aug. 2017. IEEE. (Year: 2017).*

(Continued)

*Primary Examiner* — Kakali Chaki
*Assistant Examiner* — Michael H Hoang
(74) *Attorney, Agent, or Firm* — DLA Piper LLP (US)

(57) ABSTRACT

A system and method for predicting multi-agent locations is disclosed herein. A computing system retrieves tracking data from a data store. The computing system generates a predictive model using a conditional variational autoencoder. The conditional variational autoencoder learns one or more paths a subset of agents of the plurality of agents are likely to take. The computing system receives tracking data from a tracking system positioned remotely in a venue hosting a candidate sporting event. The computing system identifies one or more candidate agents for which to predict locations. The computing system infers, via the predictive model, one or more locations of the one or more candidate agents. The computing system generates a graphical representation of the one or more locations of the one or more candidate agents.

15 Claims, 9 Drawing Sheets

(56) References Cited

U.S. PATENT DOCUMENTS

| | | | |
|---|---|---|---|
| 9,342,785 | B2 | 5/2016 | Lucey et al. |
| 9,442,933 | B2 | 9/2016 | Tzoukermann |
| 10,201,752 | B2 | 2/2019 | Lucey et al. |
| 10,460,176 | B2 | 10/2019 | Chang et al. |
| 11,157,742 | B2 | 10/2021 | Zhang et al. |
| 11,182,806 | B1 | 11/2021 | Arfa et al. |
| 11,232,109 | B1 | 1/2022 | Knoll et al. |
| 2002/0165697 | A1 | 11/2002 | Min |
| 2004/0148278 | A1 | 7/2004 | Milo et al. |
| 2005/0143198 | A1 | 6/2005 | Charge |
| 2006/0083304 | A1 | 4/2006 | Pan et al. |
| 2006/0149674 | A1 | 7/2006 | Cook et al. |
| 2006/0252476 | A1 | 11/2006 | Bahou |
| 2007/0293289 | A1 | 12/2007 | Loeb |
| 2008/0281444 | A1 | 11/2008 | Krieger et al. |
| 2009/0186679 | A1 | 7/2009 | Irvine et al. |
| 2009/0203447 | A2 | 8/2009 | Hansen et al. |
| 2010/0129780 | A1 | 5/2010 | Homsi et al. |
| 2010/0184495 | A1 | 7/2010 | Levy et al. |
| 2010/0184563 | A1 | 7/2010 | Molyneux et al. |
| 2010/0283630 | A1 | 11/2010 | Alonso |
| 2010/0298958 | A1 | 11/2010 | Connelly |
| 2011/0013087 | A1 | 1/2011 | House et al. |
| 2011/0169959 | A1 | 7/2011 | DeAngelis et al. |
| 2011/0173235 | A1 | 7/2011 | Aman et al. |
| 2011/0267461 | A1 | 11/2011 | Birenboim et al. |
| 2012/0162435 | A1 | 6/2012 | Elangovan et al. |
| 2012/0214602 | A1 | 8/2012 | Ahlstrom |
| 2013/0104870 | A1 | 5/2013 | Rizzo et al. |
| 2013/0110271 | A1 | 5/2013 | Fornell et al. |
| 2013/0225271 | A1 | 8/2013 | Amaitis |
| 2013/0238106 | A1 | 9/2013 | Ellis et al. |
| 2013/0267328 | A1 | 10/2013 | Heisler et al. |
| 2014/0142921 | A1 | 5/2014 | Gleadall et al. |
| 2014/0143183 | A1 | 5/2014 | Sigal et al. |
| 2014/0206479 | A1 | 7/2014 | Marty et al. |
| 2014/0236331 | A1 | 8/2014 | Lehmann et al. |
| 2014/0274245 | A1 | 9/2014 | Stickel |
| 2014/0302914 | A1 | 10/2014 | Weinstein et al. |
| 2014/0309000 | A1 | 10/2014 | Gustafson |
| 2014/0364976 | A1 | 12/2014 | Wohl et al. |
| 2015/0058730 | A1 | 2/2015 | Dubin et al. |
| 2015/0131845 | A1 | 5/2015 | Forouhar et al. |
| 2015/0142716 | A1 | 5/2015 | Lucey et al. |
| 2015/0148129 | A1 | 5/2015 | Austerlade et al. |
| 2015/0258416 | A1 | 9/2015 | Ianni et al. |
| 2015/0360134 | A1 | 12/2015 | Rodriguez |
| 2016/0007054 | A1 | 1/2016 | Polumbus et al. |
| 2016/0096071 | A1 | 4/2016 | Ianni et al. |
| 2016/0182415 | A1 | 6/2016 | Ames et al. |
| 2016/0203279 | A1 | 7/2016 | Srinivas et al. |
| 2016/0220878 | A1 | 8/2016 | Devathi |
| 2016/0260015 | A1 | 9/2016 | Lucey et al. |
| 2016/0375365 | A1 | 12/2016 | Thompson et al. |
| 2017/0043260 | A1 | 2/2017 | Austerlade et al. |
| 2017/0061314 | A1 | 3/2017 | Schnurr et al. |
| 2017/0072321 | A1 | 3/2017 | Thompson et al. |
| 2017/0080336 | A1 | 3/2017 | Groset |
| 2017/0109015 | A1 | 4/2017 | Krasadakis |
| 2017/0132821 | A1 | 5/2017 | Valliani et al. |
| 2017/0165570 | A1 | 6/2017 | Lucey et al. |
| 2017/0235848 | A1 | 8/2017 | Van Dusen et al. |
| 2017/0238055 | A1 | 8/2017 | Chang et al. |
| 2017/0246539 | A1 | 8/2017 | Schwartz et al. |
| 2017/0255830 | A1 | 9/2017 | Chen |
| 2017/0257653 | A1 | 9/2017 | Farre et al. |
| 2017/0291093 | A1 | 10/2017 | Janssen |
| 2017/0330029 | A1 | 11/2017 | Turcot et al. |
| 2018/0032858 | A1 | 2/2018 | Lucey et al. |
| 2018/0056124 | A1 | 3/2018 | Marty et al. |
| 2018/0084310 | A1 | 3/2018 | Katz et al. |
| 2018/0099201 | A1 | 4/2018 | Marty et al. |
| 2018/0137364 | A1 | 5/2018 | Forouhar et al. |
| 2018/0157974 | A1 | 6/2018 | Carr et al. |
| 2018/0158196 | A1 | 6/2018 | Marks |
| 2018/0204111 | A1 | 7/2018 | Zadeh et al. |
| 2018/0213033 | A1 | 7/2018 | Subbian |
| 2018/0218243 | A1 | 8/2018 | Felsen et al. |
| 2019/0087661 | A1 | 3/2019 | Lee et al. |
| 2019/0205652 | A1 | 7/2019 | Ray et al. |
| 2019/0221072 | A1 | 7/2019 | Litman |
| 2019/0224556 | A1 | 7/2019 | Ruiz et al. |
| 2019/0228290 | A1 | 7/2019 | Ruiz et al. |
| 2019/0228306 | A1 | 7/2019 | Power et al. |
| 2019/0251366 | A1 | 8/2019 | Zhong et al. |
| 2019/0374839 | A1 | 12/2019 | Wanke et al. |
| 2020/0004752 | A1 | 1/2020 | Majumdar et al. |
| 2020/0043287 | A1 | 2/2020 | Zhang et al. |
| 2020/0074181 | A1 | 3/2020 | Chang et al. |
| 2020/0170549 | A1 | 6/2020 | Baykaner et al. |
| 2020/0218902 | A1 | 7/2020 | Chang et al. |
| 2020/0230501 | A1 | 7/2020 | Schwartz et al. |
| 2020/0302181 | A1 | 9/2020 | Bhanu et al. |
| 2020/0336802 | A1 | 10/2020 | Russell et al. |
| 2020/0349611 | A1 | 11/2020 | Publicover et al. |
| 2020/0353311 | A1 | 11/2020 | Ganguly et al. |
| 2021/0056458 | A1 | 2/2021 | Savova et al. |
| 2021/0134124 | A1 | 5/2021 | Srinivasan |
| 2021/0142066 | A1 | 5/2021 | Jayaram et al. |
| 2021/0256265 | A1 | 8/2021 | Gurpinar-Morgan et al. |
| 2021/0272599 | A1 | 9/2021 | Patterson et al. |
| 2021/0304736 | A1 | 9/2021 | Kothari et al. |
| 2021/0383123 | A1 | 12/2021 | Hobbs et al. |
| 2021/0397846 | A1 | 12/2021 | Chang et al. |
| 2022/0055689 | A1 | 2/2022 | Mandlekar et al. |
| 2022/0067983 | A1 | 3/2022 | Fidler et al. |
| 2022/0253679 | A1 | 8/2022 | Power et al. |
| 2022/0270004 | A1 | 8/2022 | Ruiz et al. |
| 2022/0284311 | A1 | 9/2022 | Haynes et al. |

FOREIGN PATENT DOCUMENTS

| | | |
|---|---|---|
| KR | 10-0986647 | 10/2010 |
| WO | 2014/008134 | 1/2014 |
| WO | 2015/076682 | 5/2015 |
| WO | 2017/031356 | 2/2017 |
| WO | 2017/161167 | 9/2017 |
| WO | 2020/010040 | 1/2020 |

OTHER PUBLICATIONS

Wei, Xinyu. "Modelling and Predicting Adversarial Behaviour using Large Amounts of Spatiotemporal Data." 2016. Queensland University of Technology. (Year: 2016).*

Arabzad, et al., "Football Match Results Prediction using Artificial Neural Networks; The Case of Iran Pro League", Journal of Applied Research on Industrial Engineering, vol. 1, No. 3, Oct. 9, 2014, pp. 159-179.

International Search Report and Written Opinion for PCT Application No. PCT/US2019/014614, dated Apr. 16, 2019, 9 pages.

International Search Report and Written Opinion for PCT Application No. PCT/US2019/014608, dated Apr. 15, 2019, 12 pages.

Maher, "Modelling Association Football Scores", Statistica Neerlandica 36, nr.3, 1982, pp. 109-118.

Dixon, et al., "Modelling Association Football Scores and Inefficiencies in the Football Betting Market", Appl Statist 46. No 2, 1997, pp. 265-280.

Koopman, et al., "A dynamic bivariate Poisson model for analysing and forecasting match results in the English Premier League", Journal of the Royal Statistical Society: Series A (Statistics in Society), Sep. 24, 2012, 30 pages.

Boshnakov, et al., "A Bivariate Weibull Count Model For Forecasting Association Football Scores", International Journal of Forecasting, Sep. 9, 2016, 13 pages.

Boice, "How Our Club Soccer Projections Work", FiveThirtyEight, https://fivethirtyeight.com/features/how-our-club-soccer-projections-work/, Jan. 19, 2017, 6 pages.

Goddard, et al., "Modelling football match results and the efficiency of fixed-odds betting", Working Paper, Department of Economics, Swansea University, 2004, 27 pages.

(56) References Cited

OTHER PUBLICATIONS

Huang, et al., "A Neural Network Method for Prediction of 2006 World Cup Football game", The 2010 international joint conference on neural networks, 2010, 8 pages.
Kharrat, et al., "Plus-Minus Player Ratings for Soccer", arXiv preprint arXiv:1706.04943, Jun. 16, 2017, 17 pages.
Dubow, "San Antonio Spurs' Kawhi Leonard ruled out for Game 2 vs. Golden State Warriors", http://www.nba.com/article/2017/05/15/san-antonio-spurs-kawhi-leonard-out-game-2, May 15, 2017, 4 pages.
Beuoy, "Updated NBA Win Probability Calculator", InPredictable, http://www.inpredictable.com/2015/02/updated-nba-win-probability-calculator.html, Feb. 6, 2015, 4 pages.
Asif, et al., "In-Play forecasting of win probability in One-Day International cricket: A dynamic logistic regression model", International Journal of Forecasting 32, 2016, pp. 34-43.
Pelechrinis, "iWinRNFL: A Simple, Interpretable & Well-Calibrated In-Game Win Probability Model for NFL", arXiv preprint arXiv:1704.00197, Mar. 14, 2018, 7 pages.
Lock, et al., "Using random forests to estimate win probability before each play of an NFL game", Journal of Quantitative Analysis in Sports 10.2, 2014, pp. 197-205.
Schechtman-Rock, "Introducing NFLWin: An Open Source Implementation of NFL Win Probability", PhD Football, http://phdfootball.blogspot.com/2016/09/introducing-nflwin-open-source.html, Sep. 1, 2016, 4 pages.
Bishop, "Mixture Density Networks", Neural Computing Research Group Report, NCRG/94/004, Feb. 1994, 26 pages.
Kingma, et al., "Adam: A Method for Stochastic Optimization", arXiv preprint arXiv:1412.6980, ICLR 2015, Jan. 30, 2017, 15 pages.
Paine, "The Pats' Comeback Was Incredible—Even If You Think The Falcons Blew It", FiveThirtyEight, https://fivethirtyeight.com/features/patriots-falcons-comeback-super-bowl/, Feb. 6, 2017, 4 pages.
Deerwester, et al., "Indexing by Latent semantic Analysis", Journal of the American society for information science 41.6, 1990, 34 pages.
Blei, et al., "Latent Dirichlet Allocation", Journal of Machine Learning Research 3, 2003, pp. 993-1022.
Bengio, et al., "A Neural Probabilistic Language Model", Journal of Machine Learning Research 3, 2003, pp. 1137-1155.
Mikolov, et al., "Efficient Estimation of Word Representations in Vector Space", arXiv preprint arXiv:1301.3781, Sep. 7, 2013, 12 pages.
Mikolov, et al., "Distributed Representations of Words and Phrases and their Compositionality", Advances in neural information processing systems, 2013, 9 pages.
Ho, "Random Decision Forests", Proceedings of 3rd international conference on document analysis and recognition. vol. 1. IEEE, 1995, pp. 278-282.
van den Oord, et al., "WaveNet: A Generative Model For Raw Audio", arXiv preprint arXiv:1609.03499, Sep. 19, 2016, 15 pages.
Chung, et al., "Hierarchical Multiscale Recurrent Neural Networks", ICLR 2017, Mar. 9, 2017, 13 pages.
Graves, "Generating Sequences with Recurrent Neural Networks", arXiv preprint arXiv:1308.0850, Dated Jun. 5, 2014, 43 pages.
Sha, et al., "Fine-Grained Retrieval of Sports Plays using Tree-Based Alignment of Trajectories", arXiv preprint arXiv:1710.02255, Oct. 6, 2017, 10 pages.
Lee, et al., "Desire: Distant Future Prediction in Dynamic Scenes with Interacting Agents", Proceedings of the IEEE Conference on Computer Vision and Pattern Recognition, 2017, 10 pages.
Alahi, et al., "Social LSTM: Human Trajectory Prediction in Crowded Spaces", Proceedings of the IEEE conference on computer vision and pattern recognition, 2016, 11 pages.
Jain, et al., "Recurrent Neural Networks for Driver Activity Anticipation via Sensory-Fusion Architecture", IEEE International Conference on Robotics and Automation (ICRA), 2016, 8 pages.
Akhter, et al., "Bilinear Spatiotemporal Basis Models", ACM Transactions on Graphics, vol. 30, No. 2, Article 17, Apr. 2012, 12 pages.

Lucey, et al., "Representing and Discovering Adversarial Team Behaviors using Player Roles", Proceedings of the IEEE Conference on Computer Vision and Pattern Recognition, 2013, 8 pages.
Insafutdinov, et al., "ArtTrack: Articulated Multi-Person Tracking in the Wild", Proceedings of the IEEE Conference on Computer Vision and Pattern Recognition, 2017, 9 pages.
Le, et al., "Coordinated Multi-Agent Imitation Learning", Proceedings of the 34th International Conference on Machine Learning-vol. 70. JMLR. org, 2017, 13 pages.
Yamaguchi, et al., "Who are you with and Where are you going?", CVPR 2011. IEEE, 2011, 8 pages.
Butt, et al., "Multi-target Tracking by Lagrangian Relaxation to Min-Cost Network Flow", Proceedings of the IEEE Conference on Computer Vision and Pattern Recognition, 2013, 8 pages.
Wang, et al., "Learning Optimal Parameters For Multi-target Tracking", International journal of computer vision 122.3, 2017, 13 pages.
Maksai, et al., "What Players do with the Ball: A Physically Constrained Interaction Modeling", Proceedings of the IEEE Conference on Computer Vision and Pattern Recognition, 2016, 10 pages.
Kim, et al., "Motion Fields to Predict Play Evolution in Dynamic Sport Scenes", IEEE Computer Society Conference on Computer Vision and Pattern Recognition, 2010, 8 pages.
Chen, et al., "Learning Online Smooth Predictors for Realtime Camera Planning using Recurrent Decision Trees", Proceedings of the IFFF Conference on Computer Vision and Pattern Recognition, 2016, 14 pages.
Zheng, et al., "Generating Long-term Trajectories Using Deep Hierarchical Networks", Advances in Neural Information Processing Systems, 2016, 9 pages.
Felsen, et al., "What will Happen Next? Forecasting Player Moves in Sports Videos", Proceedings of the IEEE International Conference on Computer Vision, 2017, 10 pages.
Su, et al., "Social Behavior Prediction from First Person Videos", arXiv preprint arXiv:1611.09464, Nov. 29, 2016, 10 pages.
Koren, et al., "Matrix Factorization Techniques For Recommender Systems", Computer, IEEE Computer Society, Aug. 2009, 8 pages.
Deng, et al., "Factorized Variational Autoencoders for Modeling Audience Reactions to Movies", Proceedings of the IEEE Conference on Computer Vision and Pattern Recognition, 2017, 10 pages.
Charles, et al., "Personalizing Human Video Pose Estimation", Proceedings of the IEEE conference on computer vision and pattern recognition, 2016, 14 pages.
Kingman, et al., "Auto-Encoding Variational Bayes", arXiv preprint arXiv:1312.6114, May 1, 2014, 14 pages.
Gregor, et al., "DRAW: A Recurrent Neural Network For Image Generation", arXiv preprint arXiv:1502.04623, May 20, 2015, 10 pages.
Bowman, et al., "Generating Sentences from a Continuous Space", arXiv preprint arXiv:1511.06349, May 12, 2016, 12 pages.
Kingma, et al., "Semi-supervised Learning with Deep Generative Models", Advances in neural information processing systems, Oct. 31, 2014, 9 pages.
Sohn, et al., "Learning Structured Output Representation using Deep Conditional Generative Models", Advances in neural information processing systems, 2015, 9 pages.
van den Oord, et al., "Pixel Recurrent Neural Networks", arXiv preprint arXiv:1601.06759, Aug. 19, 2016, 11 pages.
Pathak, et al., "Contect Encoders: Feature Learning by Inpainting", Proceedings of the IEEE conference on computer vision and pattern recognition, 2016, 12 pages.
Walker, et al., "An Uncertain Future: Forecasting from Static Images using Variational Autoencoders", European Conference on Computer Vision, 2016, 17 pages.
Al-Shboul, et al., "Automated Player Selection for Sports Team using Competitive Neural Networks", International Journal of Advanced Computer Science and Applications (IJACSA), vol. 8, No. 8, 2017, pp. 457-460.
International Search Report and Written Opinion for PCT Application No. PCT/US2019/014609, dated Apr. 12, 2019, 10 pages.
International Search Report and Written Opinion for PCT Application No. PCT/US2019/014613, dated Apr. 12, 2019, 9 pages.

(56) References Cited

OTHER PUBLICATIONS

Lucey, et al., "Quality vs Quantity: Improved Shot Prediction in Soccer using Strategic Features from Spatiotemporal Data", 9th Annual MIT Sloan Sports Analytics Conference, 2015, 9 pages.
International Search Report and Written Opinion for PCT Application No. PCT/US2016/066733, dated Apr. 17, 2017, 11 pages.
Bialkowski, et al., "Large-Scale Analysis of Soccer Matches using Spatiotemporal Tracking Data", ICDM, 2014, 6 pages.
Cox, et al., "Least Squares Congealing for Unsupervised Alignment of Images", CVPR, 2008, 8 pages.
Hinton, et al. "A Fast Learning Algorithm for Deep Belief Nets", Neural Comput, 18(7), 2006, pp. 1527-1554.
Learned-Miller, "Data Driven Images Models through Continuous Joint Alignment", IEEE Transactions on Pattern Analysis and Machine Intelligence, vol. 28, No. 2, Feb. 2006, pp. 236-250.
Lucey, et al., "Representing and Discovering Adversarial Team Behaviors using Player Roles", CVPR, 2013, 8 pages.
Miller, et al., "Factorized Point Process Intensities: A Spatial Analysis of Professional Basketball", ICML, Jan. 8, 2014, 13 pages.
Peng, et al., 'RASL: Robust Alignment by Sparse and Low-rank Decomposition for Linearly Correlated Images', PAMI, vol. 34, No. 11, 2012, 8 pages.
Sha, et al., 'Chalkboarding: A New Spatiotemporal Query Paradigm for Sports Play Retrieval', IUI, 2016, 12 pages.
Wei, et al., "Predicting Serves in Tennis using Style Priors", KDD, 2015, 9 pages.
Yue, et al., "Learning Fine-Grained Spatial Models for Dynamic Sports Play Prediction", ICDM, 2014, 10 pages.
ESPN Staff, "Neymar from Barca to PSG for €222m: Timeline of the world's biggest transfer", ESPN, http://www.espn.com/soccer/blog/soccer-transfers/613/post/3170513/neymar-from-barcelona-to-psg-for-222m-euros-timeline-as-worlds-biggest-transfer-nears. Aug. 4, 2017, 18 pages.
Pulling, "Long Corner Kicks In The English Premier League: Deliveries Into The Goal Ara And Critical Area", Kinesiology: International journal of fundamental and applied kinesiology 47.2, 2015, pp. 193-201.
Casal, et al., "Analysis of Corner Kick Success in Elite Football", International Journal of Performance Analysis in Sport 2015, pp. 430-451.
Bialkowski, et al., "Large-Scale Analysis of Soccer Matches using Spatiotemporal Tracking Data", IEEE International Conference on Data Mining, 2014, 6 pages.
Lucey, et al., "Quality vs Quantity: Improved Shot Prediction in Soccer using Strategic Features from Spatiotemporal Data", 9th Annual MIT Sloan Sports Analytics Conference, Feb. 27-28, 2015, 9 pages.
Le, et al., "Data-Driven Ghosting using Deep Imitation Learning", MIT Sloan Sports Analytics Conference, Mar. 3-4, 2017, 15 pages.
Cervone, et al., "Pointwise: Predicting Points and Valuing Decisions in Real Time with NBA Optical Tracking Data", 8th Annual MIT Sloan Sports Analytics Conference, Feb. 28-Mar. 1, 2014, 9 pages.
Ross, et al., "Shortcomings In the attribution process: On the origins and maintenance of erroneous social assessments", Cambridge University Press, 1982, pp. 129-152.
Wright, "Liverpool's set-piece problem exposed in 3-3 draw with Watford", https://www.skysporte.com/football/news/15117/10985307/liverpools-set-piece-problem-exposed-in-3-3-draw-with-watford, Dec. 8, 2017, 9 pages.
Walters, "Virgil van Dijk transfer may not fix Liverpool's dismal defending of set-pieces warns Jurgen Klopp after Watford woe", https://www.mirror.co.uk/sport/football/news/liverpool-klopp-van-dijk-setpiece-10981217, Aug. 13, 2017, 21 pages.
Frey, et al., "Clustering by Passing Messages Between Data Points" Science Magazine, Feb. 15, 2007, 23 pages.
Anderson, et al., "The Numbers Game: Why Everything You Know About Soccer is Wrong", 2013, Penguin Books.
Acuna, "Unsupervised modeling of the movement of basketball players using a deep generative model," http://www.cs. toronto. edu/~davidj/projects/unsupervised model ing using a DGM. pdf, 31st Conference on Neural Information Processing Systems, 2017, 11 pages.
Felsen, et al., "Where will they go? predicting fine-grained adversarial multi-agent motion using conditional variational autoencoders," Springer Nature Switzerland AG, Proceedings of the European conference on computer vision (ECCV), 2018, pp. 761-776.
Zhao, "Research and Application of Online Learning of Formation Strategy Based on Neural Network, Information Technlology Collection of China Masters' Dissertations Full Text Database," No. 2, 2014, pp. 38-40.
Wang, et al., "Classifying NBA offensive plays using neural networks," Proceedings of MIT Sloan Sports Analytics Conference, vol. 4, 2016, 9 pages.
Pourmehr, et al., "An overview on opponent modeling in RoboCup soccer simulation 2D," Springer, 2011, pp. 402-414.
Hubácek, et al., "Lifted Relational Team Embeddings for Predictive Sports Analytics," ILP Up-and-Coming/Short Papers, 2018, 7 pages.
Carney, et al., "Predicting probability distributions for surf height using an ensemble of mixture density networks," Proceedings of the 22nd international conference on Machine learning, 2005, 8 pages.
Ji, et al., "NBA All-Star lineup prediction based on neural networks," 2013 International Conference on Information Science and Cloud Computing Companion, 2013, pp. 864-869.
Pettersson, et al., "Football match prediction using deep learning," Department of Electrical Engineering, Chalmers University of Technology, 2017, 72 pages.
Blaikie, et al., "NFL & NCAA Football Prediction using Artificial Neural network," Proceedings of the Midstates Conference for Undergraduate Research in Computer Science and Mathematics, 2011, 8 pages.
Chandler, et al., "An exploratory study of minor league baseball statistics," Journal of Quantitative Analysis in Sports 8.4, 2012.
Zhao, et al., "Applying deep bidirectional LSTM and mixture density network for basketball trajectory prediction," Optik 158, Aug. 2017, pp. 266-272.
Perricone, et al., "Predicting Results for Professional Basketball Using NBA API Data," 2016, 6 pages.
Kinoshita, et al., "Deep mixture density network for statistical model-based feature enhancement," 2017 IEEE International Conference on Acoustics, Speech and Signal Processing (ICASSP), Mar. 2017, pp. 251-255.
Srinivas, et al., "A taxonomy of deep convolutional neural nets for computer vision", Frontiers in Robotics and AI 2, Jan. 11, 2016, 13 pages.
Dertat, "Applied deep learning-part 4: Convolutional neural networks", Towards Data Science, https://towardsdatascience.com/applied-deep-learning-part-4-convolutional-neural-networks-584bc134c1e2, Nov. 8, 2017, 26 pages.
Edge AI and Vision Alliance, "Using Convolutional Neural Networks for Image Recognition", https://www.edge-ai-vision.com/2015/11/using-convolutional-neural-networks-for-image-recognition/, Nov. 12, 2015, 20 pages.
Machine Learning Notebook, "Convolutional Neural Networks— Basics", https://mlnotebook.github.io/post/CNN1/, Apr. 7, 2017, 13 pages.
Knauf, et al., "Spatio-temporal convolution kernels", Machine learning 102.2, Jul. 2015, 28 pages.
Merhej, et al., "What Happened Next? Using Deep Learning to Value Defensive Actions in Football Event-Data," KDD, Aug. 2021, pp. 3394-3403.
PCT International Application No. PCT/US22/15240, International Search Report and Written Opinion of the International Searching Authority, dated May 11, 2022, 7 pages.
Trainor, "Goalkeepers: How repeatable are shot saving performances?", STATSBOMB, https://statsbomb.com/2014/10/goalkeepers-how-repeatable-are-shot-saving-performances/, Oct. 21, 2014.
Newton, "How Youtub Perfected The Feed", The Verge, https://www.theverge.com/2017/8/30/16222850/youtube-google-brain-algorithm-video-recommendation-personalized-feed, Aug. 30, 2017.
Covington, et al., "Deep neural networks for youtube recommendations", Proceedings of the 10th ACM conference on recommender systems, pp. 191-198, Sep. 2016.

(56) References Cited

OTHER PUBLICATIONS

Cheng, et al., "Wide & deep learning for recommender systems", Proceedings of the 1st workshop on deep learning for recommender systems, Sep. 2016.
Alcorn, "(batter|pitcher) 2vec: statistic-free talent modeling with neural player embeddings", MIT Sloan Sports Analytics Conference, 2018.
Wei, et al., "The thin edge of the wedge: Accurately predicting shot outcomes in tennis using style and context priors", Proceedings of the 10th Annual MIT Sloan Sport Anal Conference, Mar. 2016.
Seidl, et al., "Bhostgusters: Realtime interactive play sketching with synthesized NBA defenses", Proceeding of the 12th MIT Sloan Sports Analytics Conference, 2018.
Maaten, et al., "Visualizing data using t-SNE", Journal of machine learning research 9/08, pp. 2579-2605, Nov. 2008.
Felsen, et al., "Body shots: Analyzing shooting styles in the NBA using body pose", MIT Sloan, Sports Analytics Conference, Mar. 2017.
Dinsdale, et al., "Interactive Gaming in Sports," U.S. Appl. No. 17/934,756, filed Sep. 23, 2022, 39 pages.
PCT International Application No. PCT/US22/17229, International Search Report and Written Opinion of the International Searching Authority, dated Jun. 9, 2022, 9 pages.
PCT International Application No. PCT/US22/18709, International Search Report and Written Opinion of the International Searching Authority, dated Jun. 24, 2022, 11 pages.
Huang, et al., "Graph Analysis of Major League Soccer Networks: CS224W Final Project," http://snap.stanford.edu/class/cs224w-2018/reports/CS224W-2018-46.pdf, Dec. 9, 2018, 9 pages.
Tian, et al., "Use of machine learning to automate the identification of basketball strategies using whole team player tracking data," Applied Sciences 10.1, Dec. 18, 2019, 17 pages.
PCT International Application No. PCT/US21/34568, International Search Report and Written Opinion of the International Searching Authority, dated Aug. 25, 2021, 9 pages.
Wagenaar, et al. "Using deep convolutional neural networks to predict goal-scoring opportunities in soccer," International Conference on Pattern Recognition Applications and Methods, vol. 2, SCITEPRESS, 2017, 8 pages.
Stein, et al. "Bring it to the pitch: Combining video and movement data to enhance team sport analysis," IEEE transactions on visualization and computer graphics 24.1,2017,, pp. 13-22.
Mehrotra, "Elements of artificial neural networks," MIT Press, 1997.
PCT International Application No. PCT/US21/16583, International Search Report and Written Opinion of the International Searching Authority, dated Apr. 23, 2021, 11 pages.
Acuna, "Unsupervised modeling of the movement of basketball players using a deep generative model," 31st Conference on Neural Information Processing Systems, 2017, 11 pages.
Felsen, et al., "Where will they go? predicting fine-grained adversarial multi-agent motion using conditional variational autoencoders," Proceedings of the European conference on computer vision (ECCV), 2018, pp. 761-776.
Nakashima, et al., "Off-line learning of soccer formations from game logs," 2010 World Automation Congress, 2010, 6 pages.
Janetzko, et al., "Feature-driven visual analytics of soccer data," 2014 IEEE conference on visual analytics science and technology (VAST), Nov. 2014, pp. 13-22.
Wagenaar, "Predicting Goal-Scoring Opportunities in Soccer by Using Deep Convolutional Neural Networks," Department of Artificial Intelligence, University of Groningen, Nov. 16, 2016, 65 pages.
Abreu, et al., "Improving a simulated soccer team's performance through a Memory-Based Collaborative Filtering approach," Applied Soft Computing 23, 2014, pp. 180-193.
McCabe, et al., "Artificial intelligence in sports prediction," Fifth International Conference on Information Technology: New Generations, IEEE Computer Society, Apr. 9, 2008, 4 pages.
Abdullah, et al., "Intelligent prediction of soccer technical skill on youth soccer player's relative performance using multivariate analysis and artificial neural network techniques," International Journal on Advanced Science, Engineering and Information Technology 6.5, Dec. 2016, pp. 668-674.
Preferred Networks, Inc., "Football Analytics using Deep Learning," YouTube, https://www.youtube.com/watch?v=hs_v3dv6OUI, Jul. 25, 2019, 3 pages.
Power, et al., "Not all passes are created equal: Objectively measuring the risk and reward of passes in soccer from tracking data," Proceedings of the 23rd ACM SIGKDD international conference on knowledge discovery and data mining, Aug. 2017, pp. 1605-1613.
Cervone, et al., "A multiresolution stochastic process model for predicting basketball possession outcomes," Journal of the American Statistical Association 111.514, 2016, pp. 585-599.
Ruiz, et al.,"The Leicester City Fairytale?" Utilizing New Soccer Analytics Tools to Compare Performance in the 15/16 & 16/17 EPL Seasons, Proceedings of the 23rd ACM SIGKDD International Conference on Knowledge Discovery and Data Mining, 2017, 13 pages.
Gyarmati, et al., "Searching for a unique style in soccer," arXiv preprint arXiv:1409.0308, 2014, 4 pages.
PCT International Application No. PCT/US21/53117, International Search Report and Written Opinion of the International Searching Authority, dated Jan. 14, 2022, 9 pages.
PCT International Application No. PCT/US22/77383, International Search Report and Written Opinion of the International Searching Authority, dated Dec. 13, 2022, 15 pages.
PCT International Application No. PCT/US22/76934, International Search Report and Written Opinion of the International Searching Authority, dated Dec. 13, 2022, 10 pages.

\* cited by examiner

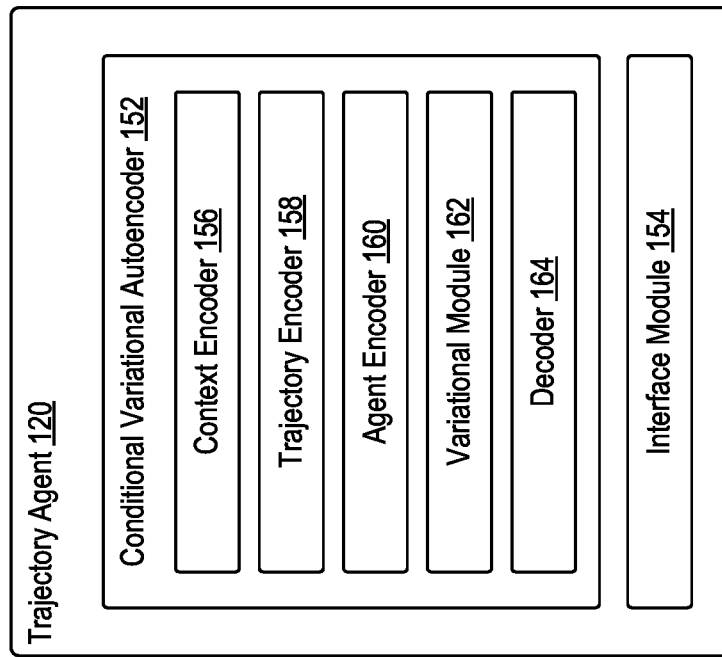

SYSTEM AND METHOD FOR PREDICTING FINE-GRAINED ADVERSARIAL MULTI-AGENT MOTION

CROSS-REFERENCE TO RELATED APPLICATIONS

This application claims priority from U.S. Provisional Application Ser. No. 62/619,891, filed, Jan. 21, 2018, which is hereby incorporated by reference in its entirety.

FIELD OF THE DISCLOSURE

The present disclosure generally relates to system and method for generating a predictive model and, more specifically, a system and method for predicting multi-agent location using the predictive model.

BACKGROUND

Humans continuously anticipate the future states of their surroundings. Someone extending a hand to another is likely initiating a handshake. A couple entering a restaurant is likely looking for a table for two. A basketball player on defense is likely trying to stay between their opponent and the basket. These predictions are critical for shaping our daily interactions, as they enable humans to navigate crowds, score in sports matches, and generally follow social mores. As such, computer vision systems that are successfully deployed to interact with humans must be capable of forecasting human behavior.

SUMMARY

Embodiments disclosed herein generally relate to a system and method for predicting multi-agent location. In one embodiment, a method is disclosed herein. A computing system retrieves tracking data from a data store. The tracking data includes a plurality of sequences of agent movement during the course of a plurality of sporting events. The computing system generates a predictive model using a conditional variational autoencoder. The conditional variational autoencoder learns one or more paths a subset of agents of the plurality of agents are likely to take based at least on historical location data of each agent in each sequence of the plurality of sequences and identity information of each agent. The computing system receives tracking data from a tracking system positioned remotely in a venue hosting a candidate sporting event. The computing system identifies one or more candidate agents for which to predict locations. The computing system infers, via the predictive model, one or more locations of the one or more candidate agents. The computing system generates a graphical representation of the one or more locations of the one or more candidate agents.

In another embodiment, a system is disclosed herein. The system includes a processor and a memory. The memory has programming instructions stored thereon, which, when executed by the processor, performs one or more operations. The one or more operations include retrieving tracking data from a data store. The tracking data includes a plurality of sequences of agent movement during the course of a plurality of sporting events. A conditional variational autoencoder generates a predictive model using a conditional variational autoencoder. The conditional variational autoencoder learns one or more paths a subset of agents of the plurality of agents are likely to take based at least on historical location data of each agent in each sequence of the plurality of sequences and identity information of each agent. The one or more operations further include receiving tracking data from a tracking system positioned remotely in a venue hosting a candidate sporting event. The one or more operations further include identifying one or more candidate agents for which to predict locations. The one or more operations further include inferring, via the predictive model, one or more locations of the one or more candidate agents. The one or more operations further include generating a graphical representation of the one or more locations of the one or more candidate agents.

In another embodiment, a non-transitory computer readable medium is disclosed herein. The non-transitory computer readable medium includes one or more sequences of instructions that, when executed by the one or more processors cause a computing system to retrieve tracking data from a data store. The tracking data includes a plurality of sequences of agent movement during the course of a plurality of sporting events. The computing system generates a predictive model using a conditional variational autoencoder. The conditional variational autoencoder learns one or more paths a subset of agents of the plurality of agents are likely to take based at least on historical location data of each agent in each sequence of the plurality of sequences and identity information of each agent. The computing system receives tracking data from a tracking system positioned remotely in a venue hosting a candidate sporting event. The computing system identifies one or more candidate agents for which to predict locations. The computing system infers, via the predictive model, one or more locations of the one or more candidate agents. The computing system generates a graphical representation of the one or more locations of the one or more candidate agents.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

FIG. 1B is a block diagram illustrating a component of the computing environment of FIG. 1A, according to example embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more embodiments disclosed herein generally relate to a system and method for predicting trajectories of one or more agents. For example, the one or more techniques disclosed herein simultaneously and accurately forecast the behavior of a plurality interacting agents, thereby permitting computer vision applications to be widely deployed (e.g., autonomous vehicles, security, surveillance, sports). In particular, one or more systems disclosed herein implements a conditional variational autoencoder, which may be configured to learn a model that "personalizes" prediction to individual agent behavior within a group representation. Although one or more examples provided herein generally relate the use of the system and methods in relation to the sport of basketball, those skilled in the art readily understand that such systems and methods may extend outside of the sport of basketball.

Team sports, generally, provide an exemplary setting for evaluating personalized behavior models. Firstly, there is a vast amount of labeled data in sports, including potentially thousands of data points for each player. Furthermore, the behaviors in team sports are well-defined and complex, with multiple agents simultaneously interacting collaboratively and adversarially. Therefore, sports tracking data is a good compromise between completely unstructured tracking data (e.g., pedestrian motion where the number of agents is unconstrained) and highly structured data (e.g., body pose or facial tracking where the number of agents is both fixed and physically connected).

One of the challenges of personalizing prediction of multi-agent motion is developing a representation that is simultaneously robust to the number of possible permutations arising in a situation and sufficiently fine-grained, so the output prediction is at the desired level of granularity. One typically employ one of two approaches: i) a bottom-up approach in which each trajectory has the same model applied to it individually, or ii) a top-down approach in which a group representation of all trajectories has one model applied to it all at once. The data and target application mainly drive the choice of approach. For example, in settings with a variable number of agents, e.g., autonomous vehicles or surveillance, a bottom-up approach may be favored; in settings with a fixed number of agents, e.g., sports, faces, and body pose, a top-down approach may be favored.

The present application solves this problem, in part, through the use of a conditional variational autoencoder and the specific conditions selected for such processes.

Figure 1A:
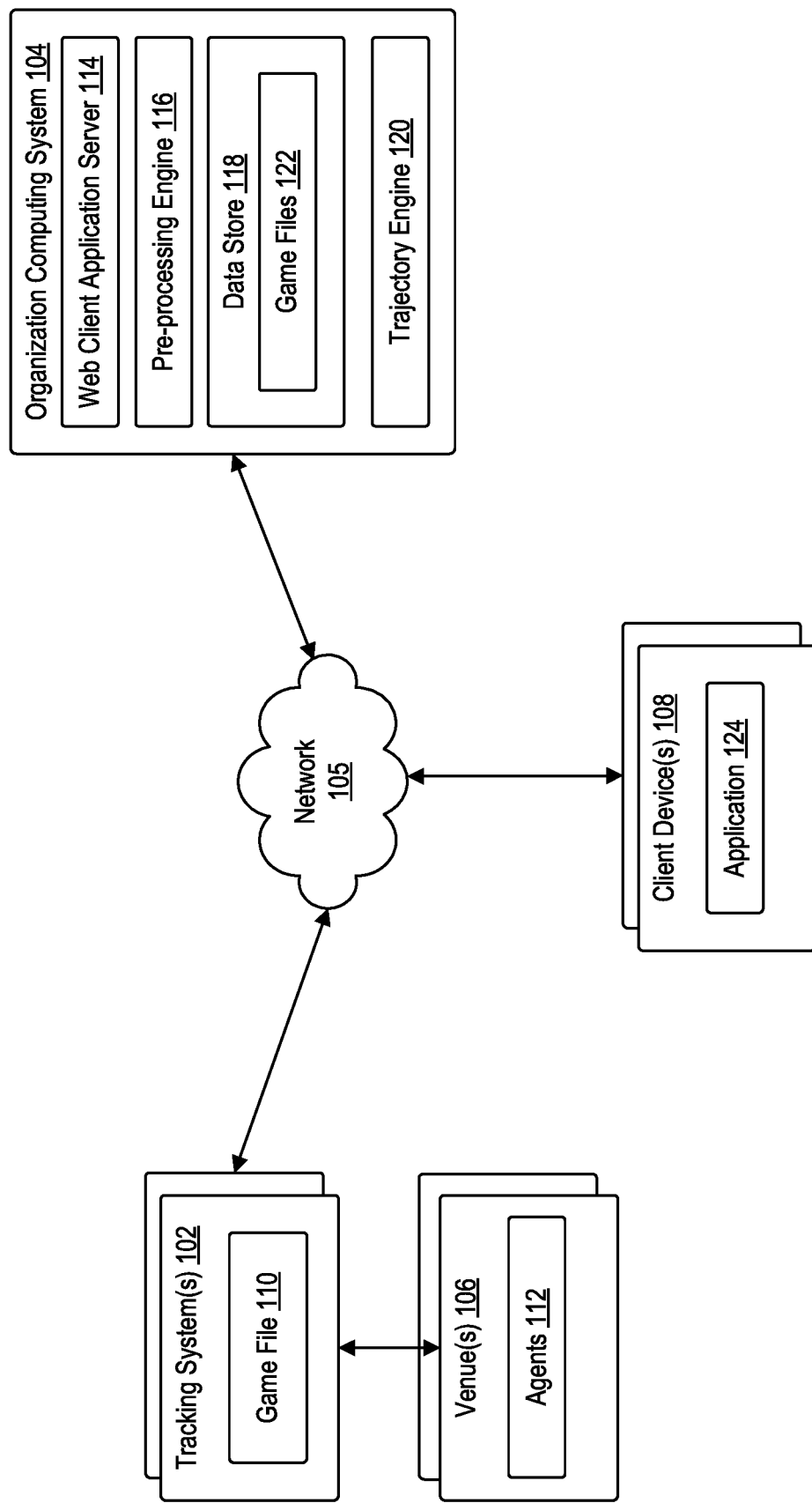
FIG. 1A is a block diagram illustrating a computing environment, according to example embodiments.

FIG. 1A is a block diagram illustrating a computing environment 100, according to example embodiments. Computing environment 100 may include tracking system 102, organization computing system 104, and one or more client devices 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

Tracking system 102 may be positioned in a venue 106. For example, venue 106 may be configured to host a sporting event that includes one or more agents 112. Tracking system 102 may be configured to record the motions of all agents (i.e., players) on the playing surface, as well as one or more other objects of relevance (e.g., ball, referees, etc.). In some embodiments, tracking system 102 may be an optically-based system using, for example, a plurality of fixed cameras. For example, a system of six stationary, calibrated cameras, which project the three-dimensional locations of players and the ball onto a two-dimensional overhead view of the court may be used. In some embodiments, tracking system 102 may be a radio-based system using, for example, radio frequency identification (RFID) tags worn by players or embedded in objects to be tracked. Generally, tracking system 102 may be configured to sample and record, at a high frame rate (e.g., 25 Hz). Tracking system 102 may be configured to store at least player identity and positional information (e.g., (x, y) position) for all agents and objects on the playing surface for each frame in a game file 110.

Game file 110 may be augmented with other event information corresponding to the captured one or more frames, such as, but not limited to, game event information (pass, made shot, turnover, etc.) and context information (current score, time remaining, etc.).

Tracking system 102 may be configured to communicate with organization computing system 104 via network 105. Organization computing system 104 may be configured to manage and analyze the data captured by tracking system 102. Organization computing system 104 may include at least a web client application server 114, a pre-processing engine 116, a data store 118, and trajectory agent 120. Each of pre-processing engine 116 and trajectory engine 116 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Data store 118 may be configured to store one or more game files 122. Each game file 122 may be captured and generated by a tracking system 102. In some embodiments, each of the one or more game files 122 may include all the raw data captured from a particular game or event. In some embodiments, the data contained in each game file 122 may include one or more sequences in the game or event represented by game file 122. Each sequence may include the same team on offense for the full duration. Each sequence may end either due to a shot (e.g., score), turnover, or foul. Accordingly, in some embodiments, the data contained in each game file 122 may not include sequences representative of transition plays (e.g., when teams switch from defense to offense mid sequences). In other words, in these embodiments, the sequences are constrained to contain persistent offense and persistent defense. Still further, in some embodiments, each sequence may be zero-centered to center-court and aligned, so that the offense always shoots toward the court's right-side basket.

Trajectory agent 120 may be configured to predict the trajectory of one or more agents given one or more historical trajectory points. For example, given an agent's coordinates up to a time $t_q$, trajectory agent 120 may use at least the agent's coordinates up to time $t_q$ to predict the agent's coordinates up to time $t_f$, where $t_f$ is after $t_q$, where q represents some end-time between (e.g., (1 . . . n)) and f represents some future time, after q (e.g., (n+1)).

Pre-processing agent 116 may be configured to process data retrieved from data store 118 prior to input to trajectory agent 120. For example, pre-processing agent 116 may be configured to align the data of a given game file 122, such that the trajectories of all agents are in a natural and consistent ordering. For example, if data is pulled from game file 122 randomly, two similar plays with similar trajectories may have different representations. To reduce (or minimize) the number of permutations, pre-processing agent may align data retrieved from data store such that the information is consistent from one play (or sequence) to the next.

Client device 108 may be in communication with organization computing system 104 via network 105. Client device 108 may be operated by a user. For example, client device 108 may be a mobile device, a tablet, a desktop computer, or any computing system having the capabilities described herein. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 108 may include at least application 124. Application 124 may be representative of a web browser that allows access to a website or a stand-alone application. Client device 108 may access application 124 to access one or more functionalities of organization computing system 104. Client device 108 may communicate over network 105 to request a webpage, for example, from web client application server 124 of organization computing system 104. For example, client device 108 may be configured to execute application 124 to access content managed by web client application server 124. The content that is displayed to client device 108 may be transmitted from web client application server 124 to client device 108, and subsequently processed by application 124 for display through a graphical user interface (GUI) of client device 108.

FIG. 1B illustrates trajectory agent 120 in greater detail, according to example embodiments. Trajectory agent 120 may include conditional variational autoencoder 152 and interface module 154. Conditional variational autoencoder 152 may be configured to learn a model that personalizes predictions to individual agent behavior within a group interaction. For example, by using conditional variational autoencoder 152, trajectory agent 120 may create a generative model that simultaneously learns the latent representation of multi-agent trajectories and may be able to predict the agents' context-specific motion.

The multi-agent trajectory prediction performed by trajectory agent 120 may be framed as follows: in a two-dimensional environment, a set A of interacting agents may be observed over the time history $[t_0, t_q]$ to have trajectories $X_A^{[t_0,t_q]}$, where:

$$X_A^{[t_0,t_q]} = \{X_i^{[t_0,t_q]}\} | \forall i \in A,$$

$t_0$=some initial time and $t_q$=some end time.

The trajectory history of the $i^{th}$ agent may be defined as:

$$X_i^{[t_0,t_q]} = \{x_i^{t_0}, x_i^{t_0+1}, \ldots, x_i^{t_q}\}$$

where $x_i^t$ may represent the two-dimensional coordinates of a trajectory at time t.

Using conditional variational autoencoder 152, trajectory agent 120 may predict the subsequent future motion, to time $t_f$, of a subset of agents $P \subseteq A$. In other words, trajectory agent 120 may leverage conditional variational autoencoder 152 to learn the posterior distribution $P(Y_P^{(t_q,t_f]} | X_A^{[t_0,t_f]}, O)$ of the future trajectory of the agents in subset P, specifically $Y_P^{(t_q,t_f]} = \{Y_j^{(t_q,t_f]}\} | \forall j \in PP$, where $Y_j$ represents the agents in subset P for which trajectories are to be determined and $t_f$=some future time after $t_q$.

In addition to the observed trajectory history, trajectory agent 120 may also condition the learned future trajectory distribution on other available observations O. For example, O may consist of: 1) the identities ρ of the agents in P; and 2) the future context C, represented by the future trajectories $X_k^{(t_q,t_f]} = \{X_l^{(t_q,t_f]}\} | \forall l \in K$ of agents in the set $K \subset A$, such that $K \cup P = A$ and $K \cap P = \{\ \}$, where l represents an agent on each team. In other words, the union of the sets of A (i.e., the agents for which trajectory agent 120 will be projecting trajectories) and K (i.e., the agents for which trajectory agent 120 will not be projecting trajectories) is the entire set A of agents in a given sequence. In some embodiments, $K = \{\ \}$. In other words, trajectory agent 120 may not rely on, or take into consideration, the future motions of any agents.

One of the improvements over conventional processes is how to include various types of information into O, and the influence of each information type on the prediction accuracy of $Y_P^{(t_q,t_f]}$.

Conditional variational autoencoder 152 may include a context encoder 156, a trajectory encoder 158, an agent encoder 160, a variational module 162, and a decoder 164. Each of context encoder 156, trajectory encoder 158, and agent encoder 160 may include N fully connected layers. For example, each layer may have roughly half the number of units as its input layer.

The conditionals and inputs to conditional variational autoencoder may be encoded using a respective encoder.

Context autoencoder 156 may be configured to encode input data directed to trajectory context. For example, context autoencoder 156 may be configured to encode input data directed to future trajectories of a subset of agents.

Trajectory encoder 158 may be configured to encode at least data directed to historical agent positional information. For example, trajectory encoder 158 may be configured to encode at least data directed to agent trajectories up to a known time $t_q$. Trajectory encoder 158 may further be configured to encode data directed to trajectory context and data directed to team identity.

Identity encoder 160 may be configured to encode identity information of each agent for which trajectory agent 120 will predict the trajectories. Such identity information may include, but is not limited to, player name, player ID, team name, team ID, position (e.g., guard, forward, shooting guard, etc.), and the like.

Variational module 162 may be configured to predict the mean and standard deviation of a latent variable distribution based on, at least, the set of information encoded by trajectory encoder 158. Decoder 164 may be configured to predict the future trajectories of each agent based on, at least, a sample of the latent variable distribution, the encoded context (from context autoencoder 156), and the encoded identity information.

Interface module 154 may be configured to generate one or more graphical user interfaces (GUIs) that include a representation of a projected trajectory for one or more players. For example, interface module 154 may generate a GUI that includes real-time (or near real-time) tracking data of agents during a game. Trajectory agent 120 may be used to fill in gaps of data that is missing from a particular sequences due, for example, from a particular agent being temporarily outside of a line of sight of tracking system 102. Accordingly, trajectory agent 120 may leverage historical positioning information of the particular agent, as well as positional data of the other agents, to project a location of the particular agent. As such, interface module 154 can include an estimated location of such agent in the GUI.

Figure 2:
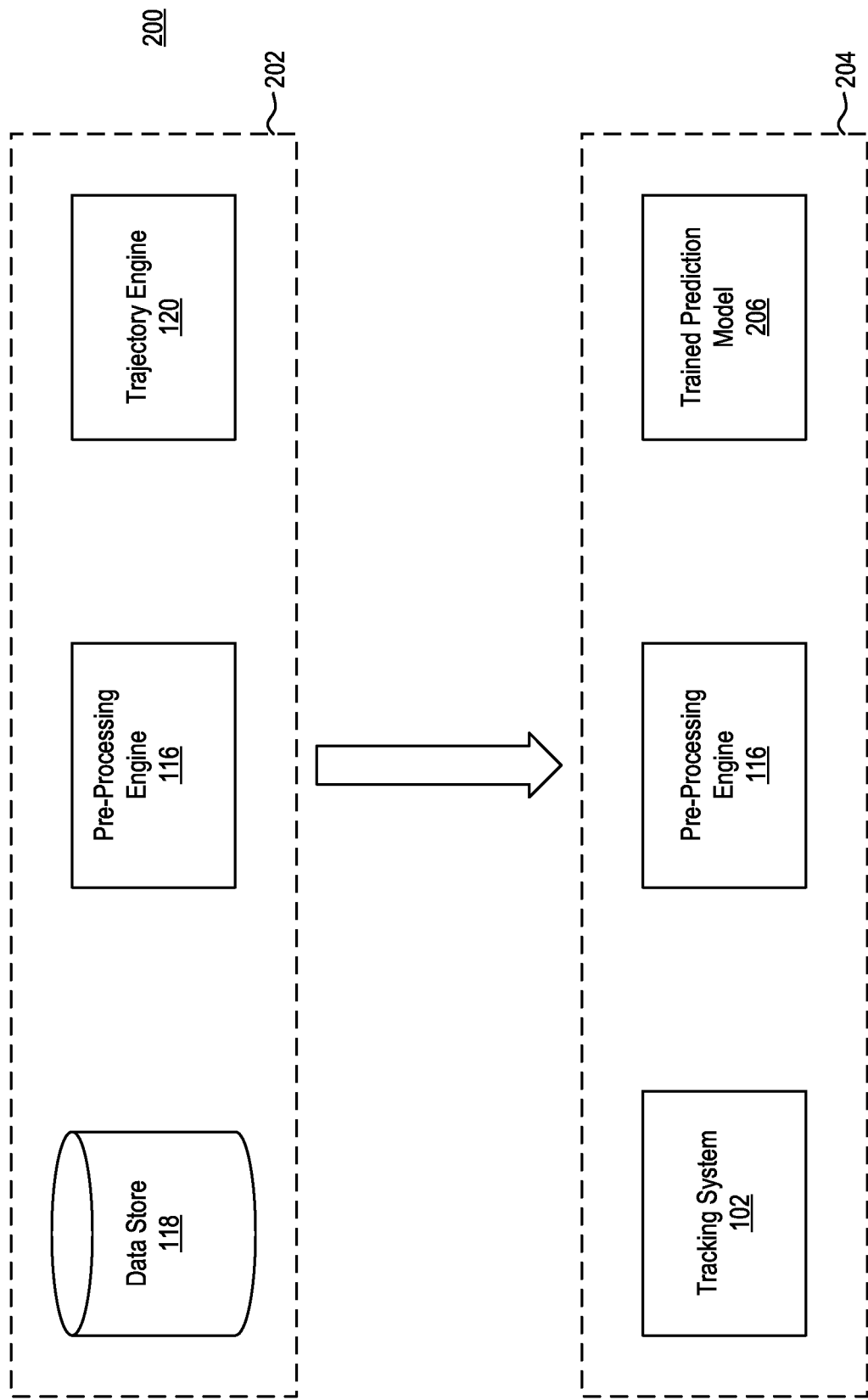
FIG. 2 is a block diagram illustrating a general method for predicting the trajectory of one or more agents, according to example embodiments.

FIG. 2 is a block diagram 200 illustrating one or more phases of predicting multi-agent motion, according to example embodiments. Block diagram 200 may include a training phase 202 and an implementation phase 204.

In training phase 202, organization computing system 104 attempts to generate a fully-trained model for use in application phase 204. Training phase 202 may include data store 118, pre-processing engine 116, and trajectory engine 120. An administrator may identify a data set for use with training conditional variational autoencoder to learn a model. For example, the data set identified by the administrator in data store 118 may include about 95,000 twelve-second sequences of two dimensional trajectories. For each sequences, the administrator may define the subset P of all agents A for which their trajectories are to be projected. Each sequence may be labeled with agent identity, team, and canonical position (e.g., point guard, shooting guard, guard, small forward, power forward, forward, center). For the subset K of all agents A for which trajectory agent 120 will not predict trajectories, each agent may be labeled by their canonical position, thus limiting the set of player identities. The data set may then be split into training, validation, and test sets. For example, the training set may include about 60,000 twelve-second sequences; the validation set may include about 15,000 twelve-second sequences; and the test set may include about 19,000 twelve-second sequences.

In some embodiments, the latent variable distribution may be modeled as a normal distribution. For example, the latent variable distribution may be modeled as:

$$Q(z=\hat{z}|X_A^{[t_0,t_q]}, X_K^{(t_q,t_f]}, \rho) = Q(z=\hat{z}|H_x, H_c, H_\rho) \sim \mathcal{N}(\mu_z, \Sigma_z)$$

where $\hat{z}$ is a sample of a latent variable, $H_x$ is a set of encoded trajectories, $H_c$ is a set of encoded context, and $H_\rho$ is the set of encoded identities. In other words, the above equation may represent the likelihood that the latent variable $z=\hat{z}$, may be conditioned on the identity, $\rho$, the previous motion, $X_A^{[t_0,t_q]}$, the future motion of the subset K of agents, $X_K^{(t_q,t_f]}$. This likelihood may be equivalent to being conditioned on the encoded future motion, $H_x$, the encoded previous motion, $H_c$, and the encoded identity, $H_\rho$. This may be concurrent to, or approximated by, the normal Gaussian distribution on the latent variable, z.

Accordingly, during training, variational module 162 may minimize the Kullback-Leibler (KL) divergence ($D_{KL}$) and trajectory decode 164 may minimize the Euclidean distance $\|Y-\hat{Y}\|_2^2$. In one example, for simplicity, let $Y=(X_P^{[t_q-1,t_q]}, Y_P^{(t_q,t_f]})$. Then the total loss may be:

$$L = \|Y-\hat{Y}\|_2^2 + \beta D_{KL}(P\|Q),$$

where $P(z|X_A^{[t_0,t_q]}, X_K^{(t_q,t_f]}, \rho) = \mathcal{N}(0,1)$ may be a prior distribution and $\beta$ may be a weighting factor to control the relative scale of the loss terms. In other words, the loss function that may be optimized for is the distance between the real position, Y, and the predicted position $\hat{Y}$. This distance may be measured using the $L_2$ norm. This distance may be added to the KL divergence between the predicted distribution, P, and the ground truth distribution, Q, weighted by a weighting factor, $\beta$.

During testing, the input to trajectory encoder 158 may be the trajectory history of all agents $X_A^{(t_0,t_q]}$, the future trajectories of the agents not predicted $X_K^{(t_q,t_f]}$, and the encoded agent identities $\rho$. As stated above, the set K of agents not predicted may be equal to the empty set. Accordingly, training and testing of the prediction model may be performed without relying on, or taking into consideration, the future trajectories of any agents.

Variational module 162 may take the encoded trajectory, $H_x$, which may also be conditioned on the context $X_K^{(t_q,t_f]}$ and the agent identities $\rho$, and may return a sample of the random latent variable $\hat{z}$. Trajectory decoder 164 may then infer the tracks (or paths) of each agent to be predicted (i.e., $X_P^{(t_q,t_f]}$) given a sampled $\hat{z}$, the encoded context $H_c$, the encoded identities $H_\rho$, and the final one second of trajectory history for agents to be predicted, $X_P^{[t_q-1,t_q]}$.

Pre-processing agent 116 may pre-process the identified data set prior to inputting the data set to training engine 120. Generally, the inputs to conditional variational autoencoder may be a concatenation of disparate two-dimensional agent trajectories. For example, the input $X_A^{[t_0,t_q]}$ may form an $|A| \times (t_q \cdot 5) \times 2$ array, where $|A|$ is the number of agents, $t_q \cdot 5$ is the total number of temporal samples over $t_q$ second sampled at 5 Hz. One of the challenges in encoding multi-agent trajectories is the presence of permutation disorder. In particular, if the trajectories of all agents in A are concatenated to form $X_A^{[t_0,t_q]}$, a natural and consistent ordering of the agents may be needed. If the trajectories of all agents in A are concatenated in a random order, then two similar plays with similar trajectories may have considerably different representations. To reduce (or minimize) the permutation order, pre-processing agent 116 may order the agents such that they are consistent from one play to another.

Pre-processing agent 116 may align agent tracks (or paths) using a tree-based role alignment. For example, pre-processing agent 116 may align agent tracks (or paths) using a tree-based role alignment, such as that discussed in Sha et al. "Fine-Grained Retrieval of Sports Plays using Tree-Based Alignment of Trajectories" (2017). Such alignment may minimize reconstruction error, and thus provide an improved (e.g., optimal) representation of multi-agent trajectories.

The tree-based alignment used by pre-processing agent may implement two alternating steps: 1) an expectation-maximization (EM) based alignment of agent positions to a template; and 2) K-means clustering of the aligned agent positions, where cluster centers may form the templates for the next EM step. Pre-processing agent 116 alternating between EM and clustering may lead to a splitting of leaf nodes in a tree until either there are fewer than M frames in a cluster or the depth of the tree exceeds D. Using a specific example, pre-processing agent 116 may set D=6 and trained separate tress for offense (e.g., M=400) and defense (e.g., M=4000). To learn a per-frame alignment tree, pre-processing agent may use 120,000 randomly sampled frames from ten basketball games.

Once pre-processing engine 116 pre-processes the data sets (e.g., training set, validating set, test set) from data store 110, pre-processing engine 116 may pass the pre-processed (e.g., aligned) data to trajectory agent 120. Trajectory agent 120 may use each respective data set to train, validate, and test a model generated by conditional variational autoencoder. The end result may be a fully trained model for use with subsequent inputs.

In implementation phase 204, organization computing system 104 may use the trained model to generate multi-agent trajectory predictions for incoming tracking information. Implementation phase 204 may include tracking system 102, pre-processing engine 116, and a trained model 206. Tracking system 102 may be configured to provide tracking data to organization computing system 104. In some embodiments, tracking system 102 may provide tracking data to organization computing system 104 in real-time (or near real-time). Pre-processing engine 116 may pre-process the data, such that the agent tracks (or paths) are aligned. For example, pre-processing engine 116 may align the data using a tree-based alignment, such as that discussed above.

Pre-processing engine 116 may pass the aligned data to predictive model 206. Predictive model 206 may predict the paths of various agents. For example, based on the aligned tracking data, predictive model 206 may project a trajectory for one or more agents. Such methodology may be beneficial in situations, for example, when incomplete tracking data is provided to organization computing system 104 on account, for example, of one or more agents outside the point-of-view of tracking system 102. With predictive model 206, organization computing system 104 may be able to accurately predict the position of such one or more agents, thus creating a more complete overview of the event for the end user.

Figure 3:
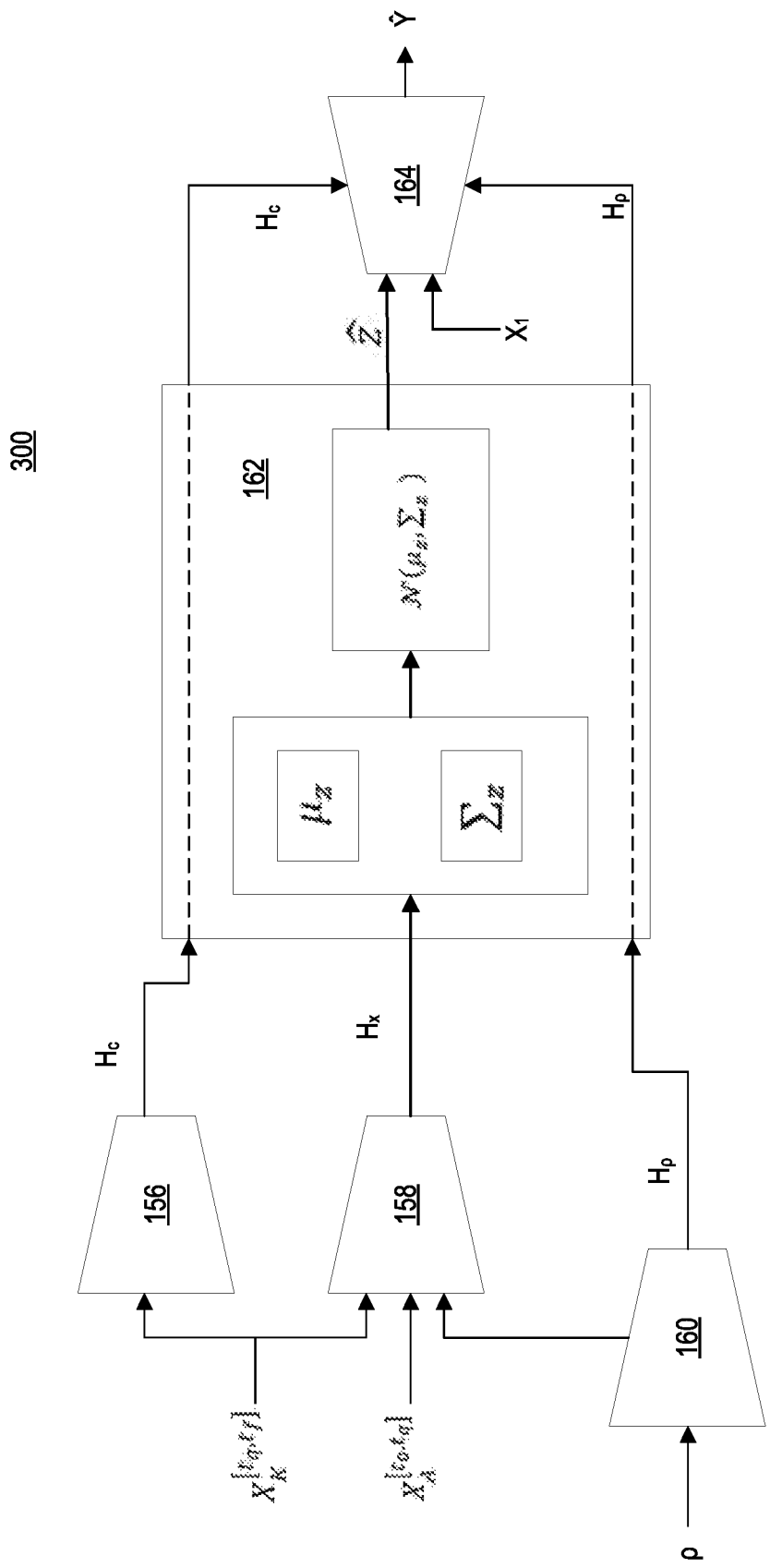
FIG. 3 is a block diagram of a conditional variational auto-encoder, according to example embodiments.

FIG. 3 is a block diagram 300 illustrating conditional variational autoencoder 152, according to example embodiments. Variational autoencoder includes context encoder 156, trajectory encoder 158, agent encoder 160, variational module 162, and decoder 164.

As illustrated, each encoder may receive, as input, one or more sets of data. Agent encoder 160 may receive, as input, the set $\rho$. The set $\rho$ may include information directed to an agent identity and/or a team identity. The output from agent encoder 160 may be a set of encoded values $H_\rho$.

In some embodiments, context encoder 156 may receive, as input, the trajectory context $X_K^{(t_q, t_f)}$. The set $X_K^{(t_q, t_f)}$ may include future trajectories of those agents for which trajectory agent 120 is not projecting trajectories. In other words, $X_k^{(t_q, t_f)} = \{X_l^{(t_q, t_f)}\} | \forall l \in K$ of agents in the set $K \subset A$, such that $K \cup P = A$ and $K \cap P = \{\}$. In some embodiments, $K = \{\}$. The output from context encoder 156 may be a set of encoded trajectory context values, $H_C$.

Trajectory encoder 158 may receive, as input the tracking history of all players, $X_A^{[t_0, t_q]}$, the trajectory context, $X_K^{(t_q, t_f)}$, and the encoded agent identity and/or team identity, $H_C$. Trajectory encoder 158 may encode the tracking history of all players, $X_A^{[t_0, t_q]}$, the trajectory context, $X_K^{(t_q, t_f)}$, and the encoded agent identity and/or team identity, $H_C$, to generate the encoded set $H_X$.

The encoded set, $H_X$, may then be provided, as input, to variational module 162. In other words, the input to variational module 162 may be the joint encoding of the trajectory history $X_A^{[t_0, t_q]}$ with the context and identity. Variational module 162 may predict the mean, $\mu_z$, and standard deviation, $\Sigma_z$, of a latent variable distribution, $\mathcal{N}(\mu_z, \Sigma_z)$, based on, at least, the set of information encoded by trajectory encoder 158. Variational module 162 may generate, as output, a random sample, $\hat{z}$, from $\mathcal{N}(\mu_z, \Sigma_z)$. The random sample, $\hat{z}$, may be concatenated with the encoded values $H_\rho$ and the encoded context $H_C$. As such, the trajectory history, context, and identity may serve as conditionals for conditional variational autoencoder 152.

The concatenated set of information (i.e., $\hat{z}$, $H_\rho$, $H_C$) may be provided as input to decoder 164. In some embodiments, the concatenated set of information may further include $X_P^{[t_q-1, t_q]}$. In other words, the concatenated set of information may include the last one second of observed trajectory history of the agents in the set P. Such information may encourage the predictions to be consistent with the observed history. Decoder 164 may output the set $X_P^{[t_q-1, t_q]}$ concatenated with $Y_P^{(t_q, t_f)}$. In other words, decoder 164 may provide as output the projected trajectory of one or more agents (i.e., $Y_P^{(t_q, t_f)}$) with the last one second of observed trajectory history of the one or more agents (i.e., $X_P^{[t_q-1, t_q]}$).

Figure 4:
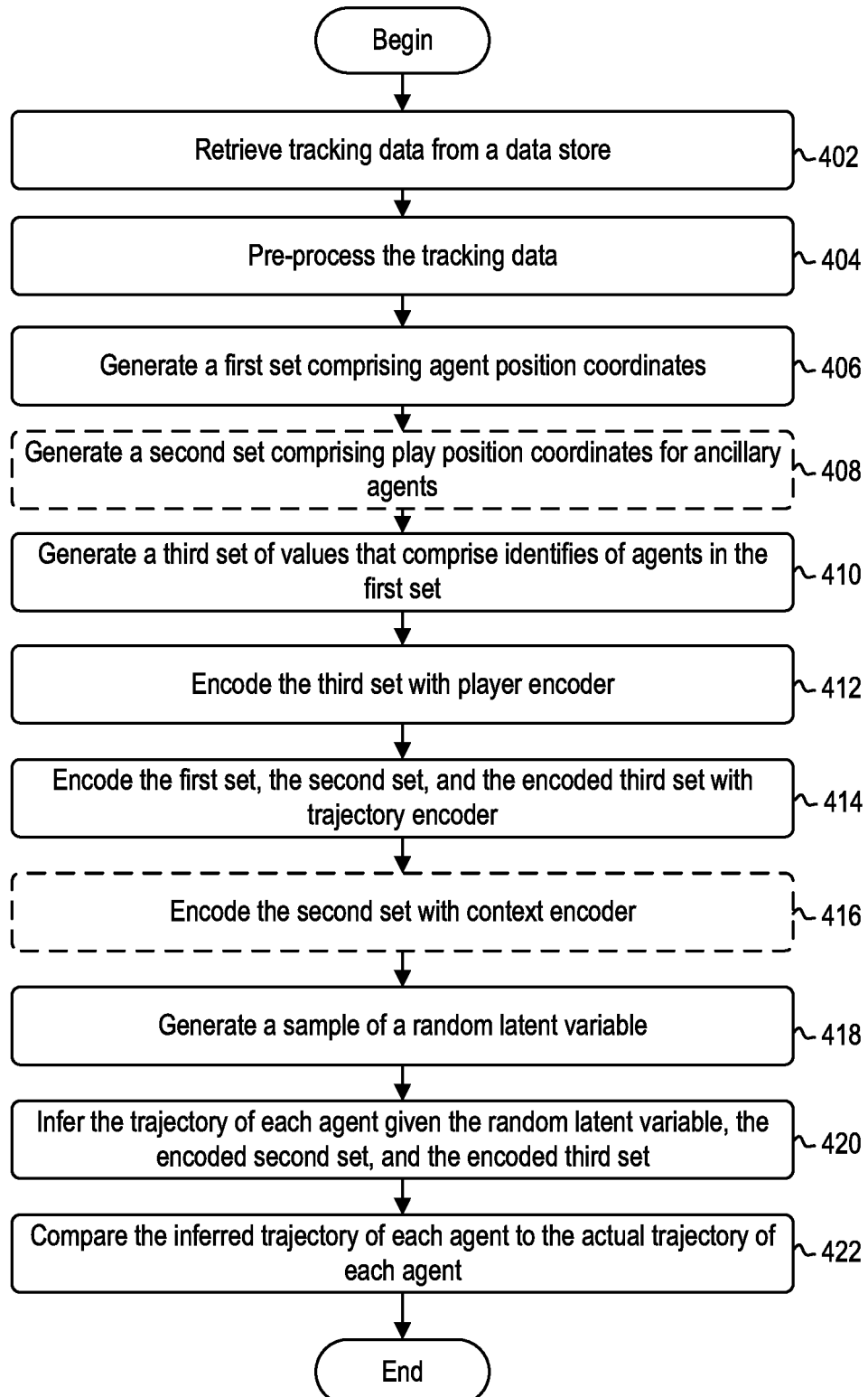
FIG. 4 is a flow diagram illustrating a method of training a conditional variational auto-encoder for predicting the trajectories of one or more agents, according to example embodiments.

FIG. 4 is a flow diagram illustration a method 400 of generating a prediction model for predicting multi-agent trajectories, according to example embodiments. Method 400 may begin at step 402.

At step 402, trajectory agent 120 may retrieve tracking data from data store 118. For example, the data set identified by the administrator in data store 118 may include a plurality of pre-defined sequences of two-dimensional trajectories. For each sequence, the administrator may define the subset P of all agents A for which their trajectories are to be projected. Each sequence may be labeled with agent identity, team, and canonical position (e.g., point guard, shooting guard, guard, small forward, power forward, forward, center). For the subset K of all agents A for which trajectory agent 120 will not predict trajectories, each agent may be labeled by their canonical position, thus limiting the set of player identities. The data set may then be split into training, validation, and test sets.

At step 404, the identified data sets may be transmitted to pre-processing agent 116. Pre-processing agent 116 may pre-process the identified tracking data. In some embodiments, pre-processing agent 116 may align the identified trajectory data, such that the trajectories of all agents are in a natural and consistent ordering. For example, given the trajectory data, two similar plays with similar trajectories may have different representations. To reduce (or minimize) the number of permutations, pre-processing agent may align data retrieved from data store such that the information is consistent from one play (or sequence) to the next.

At step 406, trajectory agent 120 may generate a first set of data that includes agent position coordinates. The first set of data may include the multi-agent trajectory of a set A of interacting agents, the coordinates of which may be observed over a time history $[t_0, t_q]$. For example, the trajectories may be represented as $X_A^{[t_0,t_q]}$.

In some embodiments, method 400 may include step 408. At step 408, trajectory agent 120 may generate a second set that is representative of agent context. The trajectory context may be represented as $X_K^{(t_q,t_f]}$. The set $X_K^{(t_q,t_f]}$ may include future trajectories of those agents for which trajectory agent 120 is not projecting trajectories. In other words, $X_K^{(t_q,t_f]} = \{X_l^{(t_q,t_f]}\} | \forall l \in K$ of agents in the set $K \subset A$, such that $K \cup P = A$ and $K \cap P = \{\ \}$. In some embodiments, $K = \{\ \}$.

At step 410, trajectory agent 120 may generate a third set of values that include the identities of agents in the first set. The identity values may be represented as $\rho$. The set $\rho$ may include information directed to an agent identity and/or a team identity.

At step 412, agent encoder 160 may encode the third set of values, $\rho$. For example, agent encoder may receive, as input, the third set of values, $\rho$, and encode the values accordingly. The output from agent encoder 160 may be a set of encoded values $H_\rho$.

At step 414, trajectory encoder 158 may encode at least the first set of values. In some embodiments, trajectory encoder 158 may encode the first set of values, the second set of values, and the third set of values to generate an output, $H_x$. For example, Trajectory encoder 158 may receive, as input the tracking history of all players, $X_A^{[t_0,t_q]}$, the trajectory context, $X_K^{(t_q,t_f]}$, and the encoded agent identity and/or team identity, $H_C$. Trajectory encoder 158 may encode the tracking history of all players, $X_A^{[t_0,t_q]}$, the trajectory context, $X_K^{(t_q,t_f]}$, and the encoded agent identity and/or team identity, $H_C$, to generate the encoded set $H_X$.

In some embodiments, method 400 may include step 416. At step 416, context encoder 156 may encode the second set of values. For example, context encoder 156 may receive, as input, the trajectory context $X_K^{(t_q,t_f]}$, and encode the trajectory context accordingly. The set $X_K^{(t_q,t_f]}$ may include future trajectories of those agents for which trajectory agent 120 is not projecting trajectories. In other words, $X_K^{(t_q,t_f]} = \{X_K^{(t_q,t_f]}\} | \forall l \in K$ of agents in the set $K \subset A$, such that $K \cup P = A$ and $K \cap P = \{\ \}$. In some embodiments, $K = \{\ \}$. The output from context encoder 156 may be a set of encoded trajectory context values, $H_C$.

At step 418, trajectory agent 120 may generate a sample of a random latent variable. For example, trajectory agent 120 may input the encoded set, $H_X$, to variational module 162. Variational module 162 may predict the mean, $\mu_z$, and standard deviation, $\Sigma_z$, of a latent variable distribution, $\mathcal{N}(\mu_z, \Sigma_z)$, based on, at least, the set of information encoded by trajectory encoder 158. Variational module 162 may generate, as output, a sample of a random latent variable, $\hat{z}$, from $\mathcal{N}(\mu_z, \Sigma_z)$.

At step 420, trajectory agent 120 may infer the trajectory of each agent based on at least the sample of the random latent variable (i.e., $\hat{z}$). For example, trajectory agent 120 may concatenate the random sample, $\hat{z}$, with the encoded values $H_\rho$ and the encoded context $H_C$. The concatenated set of information (i.e., $\hat{z}$, $H_\rho$, $H_C$) may be provided as input to decoder 164. In some embodiments, the concatenated set of information may further include $X_P^{[t_q-1,t_q]}$. Decoder 164 may output the set $X_P^{[t_q-1,t_q]}$ concatenated with $Y_P^{(t_q,t_f]}$. In other words, decoder 164 may provide as output the projected trajectory of one or more agents (i.e., $Y_P^{(t_q,t_f]}$) with the last one second of observed trajectory history of the one or more agents (i.e., $X_P^{[t_q-1,t_q]}$).

At step 422, trajectory agent 120 may compare the inferred trajectory of each agent to the actual trajectory of each agent. For example, trajectory agent 120 may utilize an $L_2$ loss function to minimize the error between the inferred trajectories (i.e., output from decoder 164) and the actual trajectories (e.g., from data store 118).

The end-result from training conditional variational autoencoder 152 may be a trained model that is able to receive live trajectory data, and generate a projected trajectory for one or more agents. In some embodiments, the trained model is able to predict between 1s and 8s of agent trajectories. In some embodiments, the trained model is able to predict greater than 8s of agent trajectories.

Figure 5:
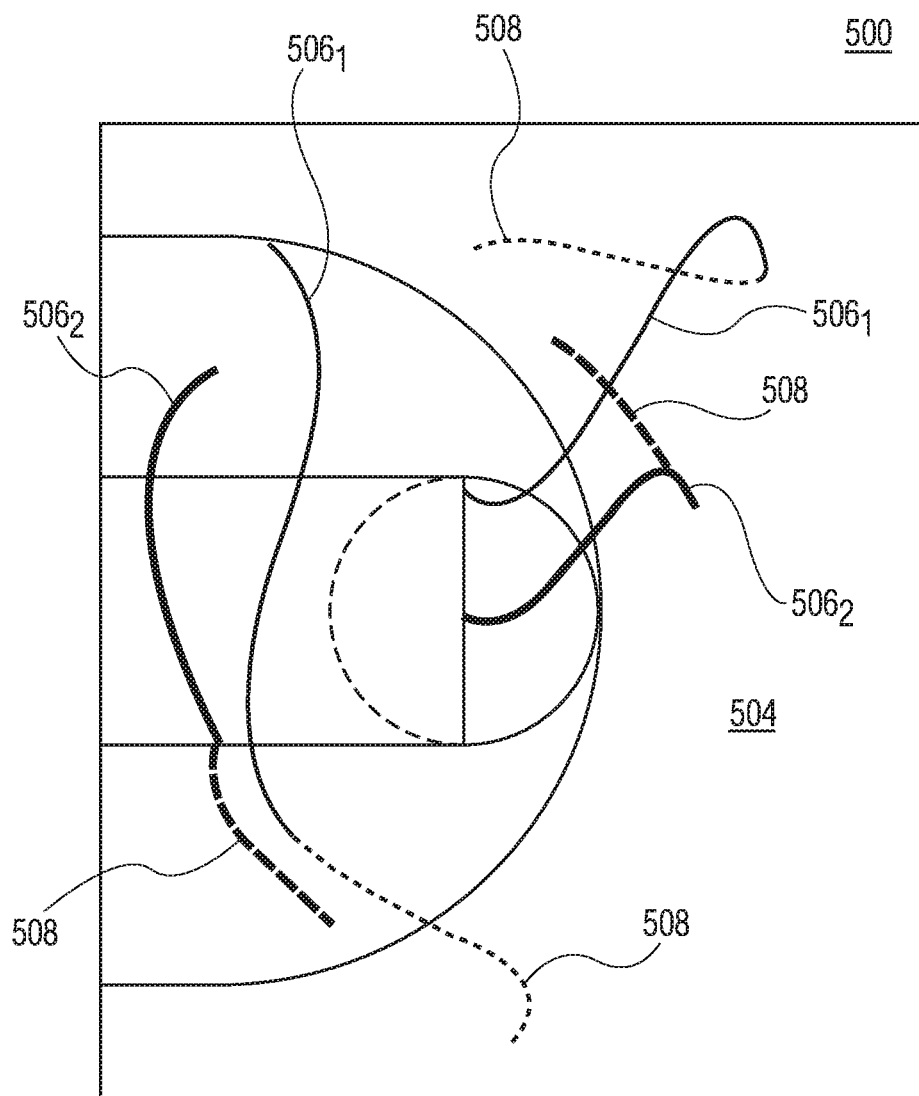
FIG. 5 is a block diagram illustrating an exemplary graphical user interface (GUI), according to example embodiments.

FIG. 5 is a block diagram 500 illustrating an example graphical user interface (GUI) 502, according to example embodiments. As shown, GUI 502 may include a representation of agent trajectories on a field of play 504. In this example, the field of play is a basketball court. Illustrated in GUI 502 may be a first agent, $A_1$, and a second agent, $A_2$. The known trajectory of $A_1$ may be represented by solid line $506_1$; the known trajectory of $A_2$ may be represented by solid line 5062. For this example, trajectory agent 120 may project the trajectory of $A_1$, while using the trajectory of $A_2$ as context. As shown, the future trajectory of $A_2$ may be represented by dashed line 508. Information directed to the future trajectory of $A_2$ and the historical trajectory of $A_1$ may be provided to trajectory agent 120 as input to generate a projected trajectory for $A_1$. The projected trajectory for $A_1$ may be represented by dashed-line 510.

Figure 6:
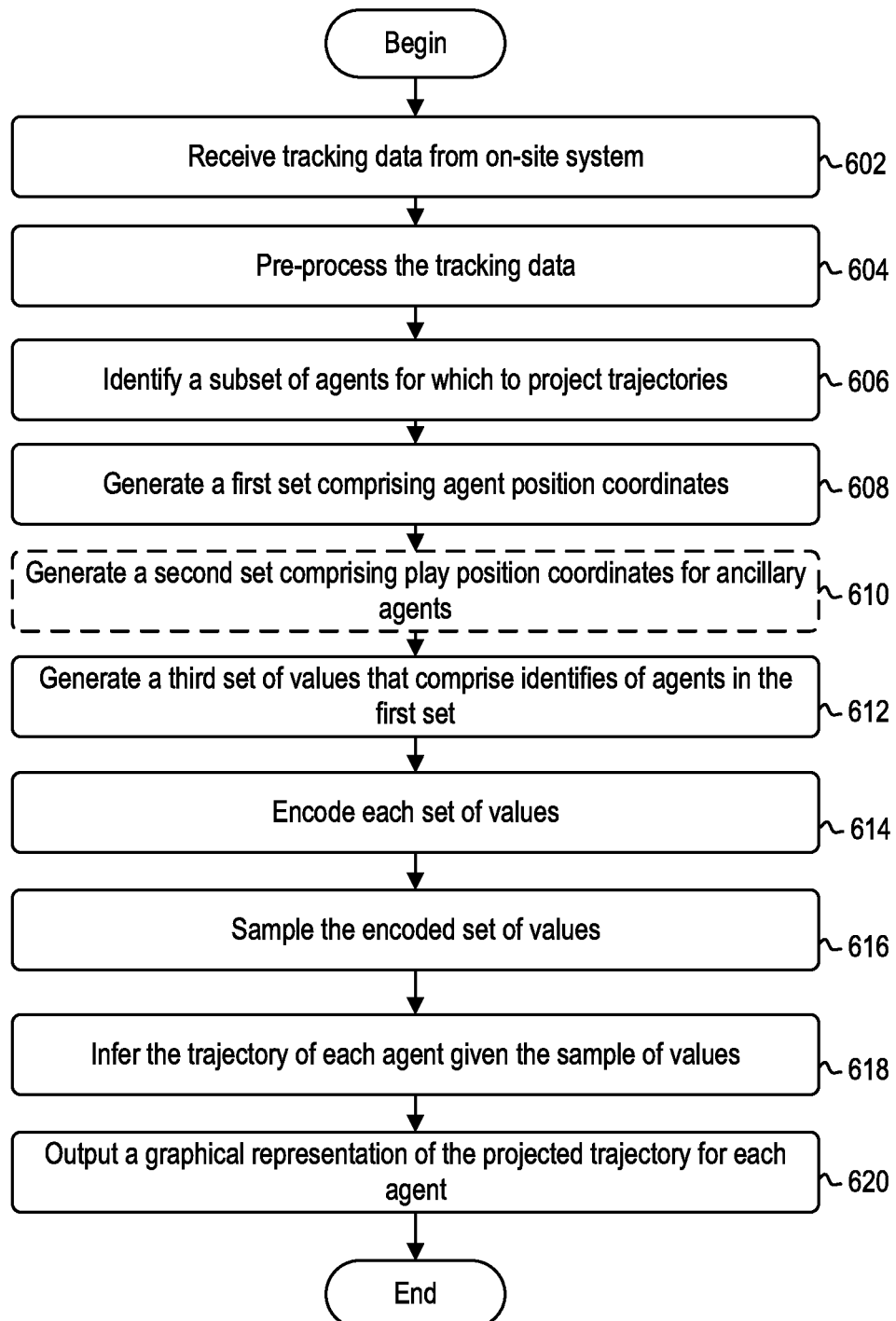
FIG. 6 is a flow diagram illustrating a method of predicting trajectories of one or more agents, according to example embodiments.

FIG. 6 is a flow diagram illustrating a method 600 of generating a projected trajectory for one or more agents using prediction model 206, according to example embodiments.

Method 600 may begin at step 602. At step 602, organization computing system 104 may receive tracking data from tracking system 102. In some embodiments, organization computing system 104 may receive tracking data from tracking system 102 in real-time (or near real-time). In some embodiments, organization computing system 104 may receive tracking data from tracking system 102 after a slight delay (e.g., 5 second delay, 10 second delay, etc.). The tracking data may include coordinates of agent position up to a time, $t_q$.

At step 604, pre-processing agent 116 may pre-process the received tracking data. In some embodiments, pre-processing agent 116 may align the trajectory data, such that the trajectories of all agents are in a natural and consistent ordering.

At step 606, trajectory agent 120 may identify a subset of agents for which to project trajectories. For example, given a set of agents A, trajectory agent 120 may select (or an administrator may select) a subset of agents P for which to project trajectories.

At step 608, trajectory agent 120 may generate a first set that includes position coordinates for each agent in the set A. The position coordinates may be sets of (x, y) coordinates from a time $t_0$ to a time $t_q$.

In some embodiments, method 600 may include step 610. At step 610, trajectory agent 120 may generate a second set that a second set that is representative of agent context. For example, trajectory agent 120 may generate a second set of data that includes the trajectories of those agents, K, for which trajectory agent 120 is not projecting trajectories. Accordingly, as recited above, the second set may be an empty set, i.e., the trajectory prediction does not depend on or require the future projections of any other agents.

At step 612, trajectory agent 120 may generate a third set of values that include the identities of agents in the first set. The identity values may be represented as ρ. The set ρ may include information directed to an agent identity and/or a team identity.

At step 614, trajectory agent 120 may encode each set of values. For example, agent encoder 160 may encode the third set of values corresponding to the identity values. Trajectory encoder 158 may encode at least the first set of values. In some embodiments, trajectory encoder 158 may encode the first set of values, the second set of values, and the third set of values to generate an encoded output. For example, Trajectory encoder 158 may receive, as input the tracking history of all players, the trajectory context, and the encoded agent identity and/or team identity. Context encoder 156 may encode the second set of values. For example, context encoder 156 may receive, as input, the trajectory context, and encode the trajectory context accordingly.

At step 616, variational module 162 may sample the set of information provided as input. For example, variational module 162 may sample the encoded data generated by trajectory agent 158 (i.e., the encoded first set of values, the encoded second set of values, and the re-encoded third set of values).

At step 618, decoder 164 may infer the trajectories of the one or more agents based on the sample generated by variational module 162. For example, decoder 164 may infer the trajectories of the one or more agents based on a vector that includes a concatenated set of data comprising: (1) the sample of the set of information generated by variational module 162; (2) the encoded identity values; and (3) the encoded context values. In some embodiments, the concatenated set of data may further include the last one second of observed trajectory history of the one or more agents.

At step 620, trajectory agent 120 may generate a graphical representation of the projected trajectory of each agent. For example, interface module 154 may generate a graphical user interface that includes the graphical representation of the projected trajectory of each agent.

Figure 7:
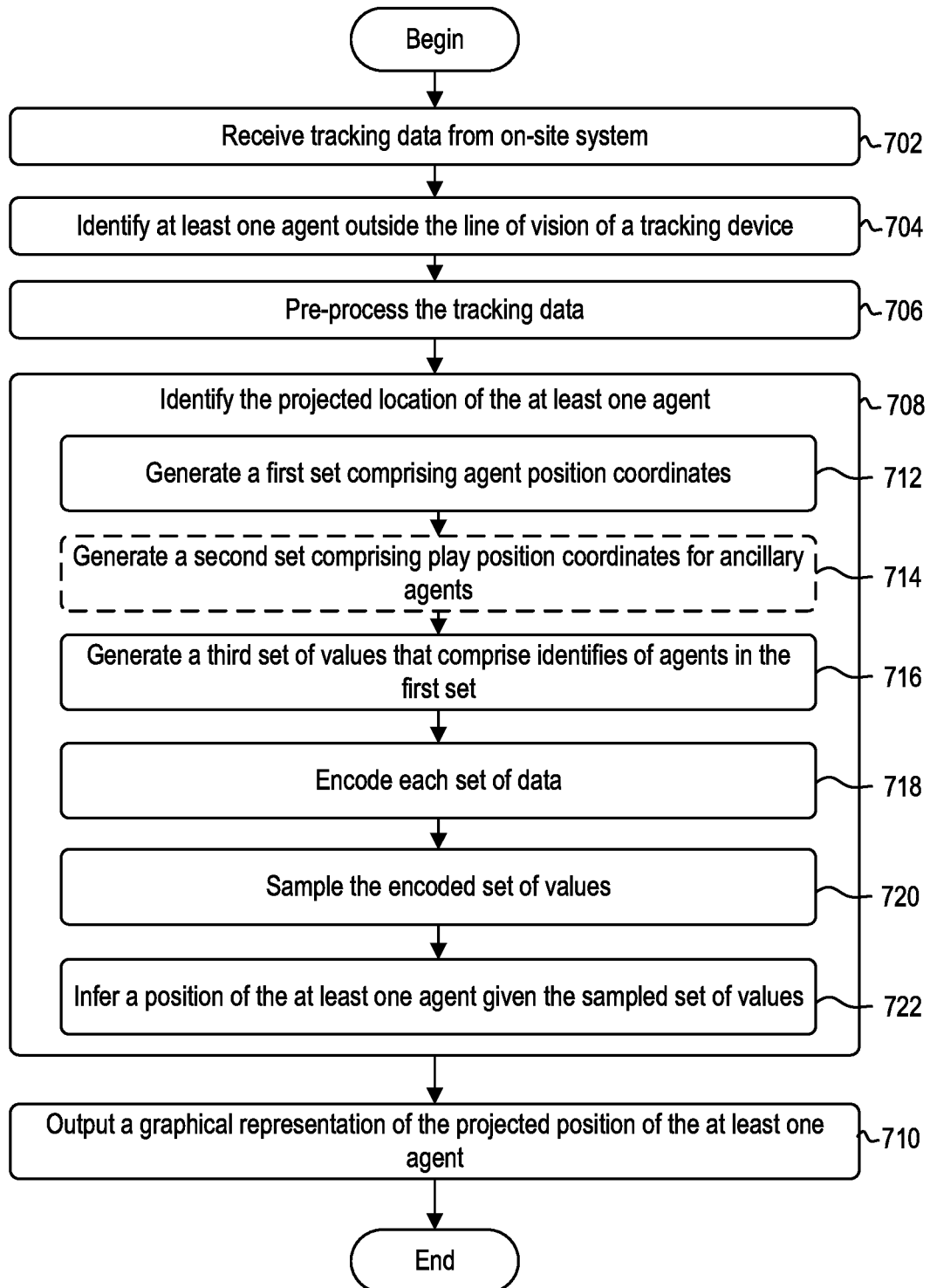
FIG. 7 is a flow diagram illustrating a method of predicting agent location, according to example embodiments.

FIG. 7 is a flow diagram illustrating a method 700 of generating a projected trajectory for one or more agents using prediction model 206, according to example embodiments.

Method 700 may begin at step 702. At step 702, organization computing system 104 may receive tracking data from tracking system 102. In some embodiments, organization computing system 104 may receive tracking data from tracking system 102 in real-time (or near real-time). In some embodiments, organization computing system 104 may receive tracking data from tracking system 102 after a slight delay (e.g., 5 second delay, 10 second delay, etc.). The tracking data may include coordinates of agent position up to a time, $t_q$. Although method 700 discuses use of live (or near-live) information, those skilled in the art may recognize that the following processes may be performed using historical (or non-live) information.

At step 704, organization computing system 104 may identify at least one agent outside the line of vision of a tracking system 102. For example, at least one agent may be outside the line of vision of the one or more cameras of tracking system 102 due to, for example, injury, lack of hustle, etc.

At step 706, pre-processing agent 116 may pre-process the received tracking data. In some embodiments, pre-processing agent 116 may align the trajectory data, such that the trajectories of all agents are in a natural and consistent ordering.

At step 708, trajectory agent 120 may identify the projected location of the at least one agent that was outside the line of vision of a tracking system 102. Step 708 may include one or more substeps 712-722.

At step 712, trajectory agent 120 may generate a first set that includes position coordinates for each agent in the set A. The position coordinates may be sets of (x, y) coordinates from a time $t_0$ to a time $t_q$.

In some embodiments, method 700 may include step 714. At step 714, trajectory agent 120 may generate a second set that a second set that is representative of agent context. For example, trajectory agent 120 may generate a second set of data that includes the trajectories of those agents, K, for which trajectory agent 120 is not projecting trajectories. In some embodiments, K={ }.

At step 716, trajectory agent 120 may generate a third set of values that include the identities of agents in the first set. The identity values may be represented as ρ. The set ρ may include information directed to an agent identity and/or a team identity.

At step 718, trajectory agent 120 may encode each set of values. For example, agent encoder 160 may encode the third set of values corresponding to the identity values. Trajectory encoder 158 may encode at least the first set of values. In some embodiments, trajectory encoder 158 may encode the first set of values, the second set of values, and the third set of values to generate an encoded output. For example, Trajectory encoder 158 may receive, as input the tracking history of all players, the trajectory context, and the encoded agent identity and/or team identity. Context encoder 156 may encode the second set of values. For example, context encoder 156 may receive, as input, the trajectory context, and encode the trajectory context accordingly.

At step 720, variational module 162 may sample the set of information provided as input. For example, variational module 162 may sample the encoded data generated by trajectory agent 158 (i.e., the encoded first set of values, the encoded second set of values, and the re-encoded third set of values).

At step 722, decoder 164 may infer the trajectories of the at least one agent based on the sample generated by variational module 162. For example, decoder 164 may infer the trajectories of the one or more agents based on a vector that includes a concatenated set of data comprising: (1) the sample of the set of information generated by variational module 162; (2) the encoded identity values; and (3) the encoded context values. In some embodiments, the concatenated set of data may further include the last one second of observed trajectory history of the one or more agents.

At step 710, trajectory agent 120 may generate a graphical representation of the projected trajectory of the at least one agent. For example, interface module 154 may generate a graphical user interface that includes the graphical representation of the projected trajectory of the at least one agent. Accordingly, any end users tracking the game via client device 108, may be able to view the position of all agents on the field of player, even when a portion of the agents may be outside the line of sight of tracking system 102.

Figure 8A:
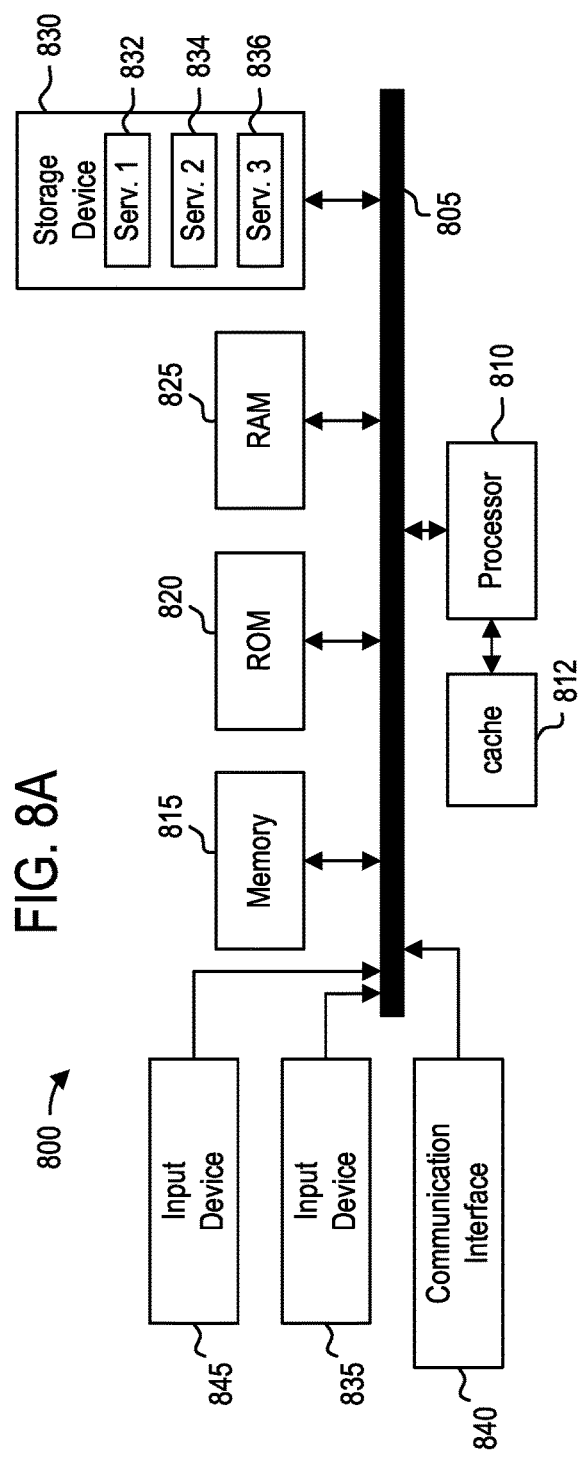
FIG. 8A is a block diagram illustrating a computing device, according to example embodiments.

FIG. 8A illustrates a system bus computing system architecture 800, according to example embodiments. System 800 may be representative of at least a portion of organization computing system 104. One or more components of system 800 may be in electrical communication with each other using a bus 805. System 800 may include a processing unit (CPU or processor) 810 and a system bus 805 that couples various system components including the system memory 815, such as read only memory (ROM) 820 and random access memory (RAM) 825, to processor 810. System 800 may include a cache of high-speed memory connected directly with, in close proximity to, or integrated as part of processor 810. System 800 may copy data from memory 815 and/or storage device 830 to cache 812 for quick access by processor 810. In this way, cache 812 may provide a performance boost that avoids processor 810 delays while waiting for data. These and other modules may control or be configured to control processor 810 to perform various actions. Other system memory 815 may be available for use as well. Memory 815 may include multiple different types of memory with different performance characteristics. Processor 810 may include any general purpose processor and a hardware module or software module, such as service 1 832, service 2 834, and service 3 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction with the computing device 800, an input device 845 may represent any number of input mechanisms, such as a microphone for speech, a touch-sensitive screen for gesture or graphical input, keyboard, mouse, motion input, speech and so forth. An output device 835 may also be one or more of a number of output mechanisms known to those of skill in the art. In some instances, multimodal systems may enable a user to provide multiple types of input to communicate with computing device 800. Communications interface 840 may generally govern and manage the user input and system output. There is no restriction on operating on any particular hardware arrangement and therefore the basic features here may easily be substituted for improved hardware or firmware arrangements as they are developed.

Storage device 830 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 825, read only memory (ROM) 820, and hybrids thereof.

Storage device 830 may include services 832, 834, and 836 for controlling the processor 810. Other hardware or software modules are contemplated. Storage device 830 may be connected to system bus 805. In one aspect, a hardware module that performs a particular function may include the software component stored in a computer-readable medium in connection with the necessary hardware components, such as processor 810, bus 805, display 835, and so forth, to carry out the function.

Figure 8B:
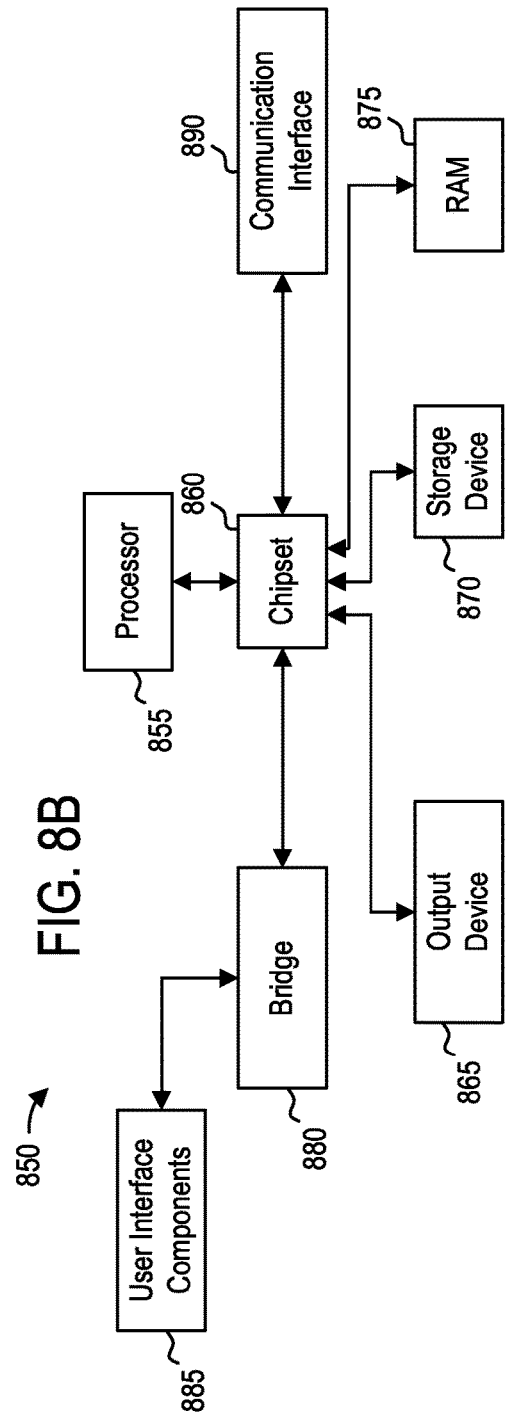
FIG. 8B is a block diagram illustrating a computing device, according to example embodiments.

FIG. 8B illustrates a computer system 850 having a chipset architecture that may represent at least a portion of organization computing system 104. Computer system 850 may be an example of computer hardware, software, and firmware that may be used to implement the disclosed technology. System 850 may include a processor 855, representative of any number of physically and/or logically distinct resources capable of executing software, firmware, and hardware configured to perform identified computations. Processor 855 may communicate with a chipset 860 that may control input to and output from processor 855. In this example, chipset 860 outputs information to output 865, such as a display, and may read and write information to storage device 870, which may include magnetic media, and solid state media, for example. Chipset 860 may also read data from and write data to RAM 875. A bridge 880 for interfacing with a variety of user interface components 885 may be provided for interfacing with chipset 860. Such user interface components 885 may include a keyboard, a microphone, touch detection and processing circuitry, a pointing device, such as a mouse, and so on. In general, inputs to system 850 may come from any of a variety of sources, machine generated and/or human generated.

Chipset 860 may also interface with one or more communication interfaces 890 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 855 analyzing data stored in storage 870 or 875. Further, the machine may receive inputs from a user through user interface components 885 and execute appropriate functions, such as browsing functions by interpreting these inputs using processor 855.

It may be appreciated that example systems 800 and 850 may have more than one processor 810 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method of predicting multi-agent location, comprising:

receiving, by a computing system, tracking data from a tracking system positioned remotely in a venue hosting a sporting event, the tracking data comprising agent coordinate data for a plurality of sequences of agent movement for a plurality of agents on a playing surface during the sporting event;

accessing, by the computing system, identity information for each agent of the plurality of agents, the identity information comprising at least one of agent name, agent team, and agent position;

projecting, by the computing system, a future location of each agent of the plurality of agents on the playing surface by:

encoding, by a first encoder of a conditional variational autoencoder, the agent coordinate data for the plurality of sequences to generate a first encoded data set, encoding, by a second encoder of the conditional variational autoencoder, the identity information for each agent to generate a second encoded data set, encoding, by a third encoder of the conditional variational autoencoder, future trajectory information of a second plurality of agents to generate a third encoded data set, wherein the second plurality of agents are on the playing surface with the plurality of agents, and predicting, by the conditional variational autoencoder, one or more paths each agent of the plurality of agents is likely to take based at least on the first encoded data set, the second encoded data set, and the third encoded data set, the conditional variational autoencoder trained using historical location data of each agent for a plurality of sporting events; and generating, by the computing system, a graphical representation of the future location of each agent on the playing surface.

2. The method of claim 1, further comprising:

pre-processing, by the computing system, the tracking data by aligning agent tracks using a tree-based role alignment.

3. The method of claim 1, further comprising:

generating, by a variation module of the conditional variational autoencoder, a sample of a random latent variable based on the second encoded data set.

4. The method of claim 3, wherein the variation module predicts a mean and standard deviation of a latent variable distribution based on the second encoded data set.

5. The method of claim 3, further comprising:

inferring, by a decoder, a location of each agent based on the sample of the random latent variable, the first encoded data set, and the second encoded data set.

6. A system, comprising:

a processor; and a memory having programming instructions stored thereon, which, when executed by the processor, performs one or more operations, comprising:

receiving tracking data from a tracking system positioned remotely in a venue hosting a sporting event, the tracking data comprising agent coordinate data for a plurality of sequences of agent movement for a plurality of agents on a playing surface during the sporting event;

accessing identity information for each agent of the plurality of agents, the identity information comprising at least one of agent name, agent team, and agent position;

projecting a future location of each agent of the plurality of agents on the playing surface by:

encoding, by a first encoder of a conditional variational autoencoder, the agent coordinate data for the plurality of sequences to generate a first encoded data set, encoding, by a second encoder of the conditional variational autoencoder, the identity information for each agent to generate a second encoded data set, encoding, by a third encoder of the conditional variational autoencoder, future trajectory information of a second plurality of agents to generate a third encoded data set, wherein the second plurality of agents are on the playing surface with the plurality of agents, and predicting, by the conditional variational autoencoder, one or more paths a subset of agents of the plurality of agents is likely to take based at least on the first encoded data set, the second encoded data set, and the third encoded data set, the conditional variational autoencoder trained using historical location data of each agent for a plurality of sporting events; and generating a graphical representation of the future location of each agent on the playing surface.

7. The system of claim 6, wherein the one or more operations further comprises:

pre-processing the tracking data by aligning agent tracks using a tree-based role alignment.

8. The system of claim 6, wherein the one or more operations further comprise:

generating, by a variation module of the conditional variational autoencoder, a sample of a random latent variable based on the second encoded data set.

9. The system of claim 8, wherein the variation module predicts a mean and standard deviation of a latent variable distribution based on the second encoded data set.

10. The system of claim 8, wherein the one or more operations further comprise:

inferring, by a decoder, a location of each agent based on the sample of the random latent variable, the first encoded data set, and the second encoded data set.

11. A non-transitory computer readable medium including one or more sequences of instructions that, when executed by one or more processors causes a computing system to perform operations comprising:

receiving, by the computing system, tracking data from a tracking system positioned remotely in a venue hosting a sporting event, the tracking data comprising agent coordinate data for a plurality of sequences of agent movement for a plurality of agents on a playing surface during the sporting event;

accessing, by the computing system, identity information for each agent of the plurality of agents, the identity information comprising at least one of agent name, agent team, and agent position;

projecting, by the computing system, a future location of each agent of the plurality of agents on the playing surface by:

encoding, by a first encoder of a conditional variational autoencoder, the agent coordinate data for the plurality of sequences to generate a first encoded data set, encoding, by a second encoder of the conditional variational autoencoder, the identity information for each agent to generate a second encoded data set, encoding, by a third encoder of the conditional variational autoencoder, future trajectory information of a second plurality of agents to generate a third encoded data set, wherein the second plurality of agents are on the playing surface with the plurality of agents, and predicting, by the conditional variational autoencoder, one or more paths each agent of the plurality of agents is likely to take based at least on the first encoded data set, the second encoded data set, and the third encoded data set, the conditional variational autoencoder trained using historical location data of each agent for a plurality of sporting events; and generating, by the computing system, a graphical representation of the future location of each agent on the playing surface.

12. The non-transitory computer readable medium of claim 11, further comprising:

pre-processing, by the computing system, the tracking data by aligning agent tracks using a tree-based role alignment.

13. The non-transitory computer readable medium of claim 11, further comprising:

generating, by a variation module of the conditional variational autoencoder, a sample of a random latent variable based on the second encoded data set.

14. The non-transitory computer readable medium of claim 13, wherein the variation module predicts a mean and standard deviation of a latent variable distribution based on the second encoded data set.

15. The non-transitory computer readable medium of claim 13, further comprising:

inferring, by a decoder, a location of each agent based on the sample of the random latent variable, the first encoded data set, and the second encoded data set.

* * * * *